United States Patent
Levy et al.

(10) Patent No.: US 11,102,120 B2
(45) Date of Patent: *Aug. 24, 2021

(54) STORING KEYS WITH VARIABLE SIZES IN A MULTI-BANK DATABASE

(71) Applicant: MARVELL ISRAEL (M.I.S.L) LTD., Yokneam (IL)

(72) Inventors: Gil Levy, Hod Hasharon (IL); Carmi Arad, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 204 days.

This patent is subject to a terminal disclaimer.

(21) Appl. No.: 16/166,692

(22) Filed: Oct. 22, 2018

(65) Prior Publication Data

US 2019/0058661 A1 Feb. 21, 2019

Related U.S. Application Data

(60) Continuation of application No. 14/250,833, filed on Apr. 11, 2014, now Pat. No. 10,110,492, which is a (Continued)

(51) Int. Cl.
*H04L 12/743* (2013.01)
*G06F 16/245* (2019.01)
(Continued)

(52) U.S. Cl.
CPC ........ *H04L 45/7453* (2013.01); *G06F 16/245* (2019.01); *G06F 16/9014* (2019.01);
(Continued)

(58) Field of Classification Search
None
See application file for complete search history.

(56) References Cited

U.S. PATENT DOCUMENTS 6,374,326 B1 4/2002 Kansal et al.
6,430,672 B1 * 8/2002 Dhong ................ G06F 12/0292
711/202

(Continued)

FOREIGN PATENT DOCUMENTS

GB 2474839 A 5/2011

OTHER PUBLICATIONS

Eastlake et al., "Trill: Fine-Grained Labeling," Internet-Draft, 21 pages (Dec. 8, 2011).

(Continued)

*Primary Examiner* — Augustine K. Obisesan

(57) ABSTRACT

A network device determines, based on a size of a lookup value, that the lookup value is to be stored across a set of two or more memory banks including a first memory bank and a second memory bank of a database. A first hash function is for determining locations for storing lookup values entirely in the first memory bank, whereas a second hash function is for determining locations for storing lookup values entirely in the second memory bank. A hash operation is performed on the lookup value using the first hash function to determine a memory location for storing the lookup value. A first segment of the lookup value is stored in the first memory bank at the memory location determined using the first hash function, and a second segment of the lookup value is stored in the second memory bank at the memory location determined using the first hash function.

18 Claims, 7 Drawing Sheets

Related U.S. Application Data division of application No. 14/250,621, filed on Apr. 11, 2014, now Pat. No. 9,967,187.

(60) Provisional application No. 61/923,093, filed on Jan. 2, 2014, provisional application No. 61/811,011, filed on Apr. 11, 2013.

(51) Int. Cl.
*H04L 12/935* (2013.01)
*G06F 16/901* (2019.01)
*G06F 16/22* (2019.01)
*H04L 12/773* (2013.01)

(52) U.S. Cl.
CPC ...... *H04L 49/3009* (2013.01); *G06F 16/2255* (2019.01); *G06F 16/9017* (2019.01); *H04L 45/60* (2013.01)

(56) References Cited

U.S. PATENT DOCUMENTS

| | | | |
|---|---|---|---|
| 7,069,268 | B1 | 6/2006 | Burns |
| 8,184,953 | B1 | 5/2012 | Covell et al. |
| 8,712,216 | B1 | 4/2014 | Covell et al. |
| 9,171,030 | B1 | 10/2015 | Arad et al. |
| 9,269,439 | B1 | 2/2016 | Levy et al. |
| 9,967,187 | B2 | 5/2018 | Levy et al. |
| 10,110,492 | B2 | 10/2018 | Levy et al. |
| 2002/0107585 | A1 | 8/2002 | Lu |
| 2003/0081615 | A1 | 5/2003 | Kohn et al. |
| 2004/0044868 | A1 | 3/2004 | Guerrero |
| 2004/0109365 | A1 | 6/2004 | Stojancic |
| 2004/0193619 | A1 | 9/2004 | Venkatachary et al. |
| 2004/0205056 | A1 | 10/2004 | Mori et al. |
| 2004/0205229 | A1 | 10/2004 | Stojancic |
| 2005/0138276 | A1 | 6/2005 | Navada et al. |
| 2005/0174272 | A1* | 8/2005 | Cadambi ............ G06F 16/9014 341/106 |
| 2006/0184556 | A1 | 8/2006 | Tan et al. |
| 2007/0286194 | A1 | 12/2007 | Shavitt et al. |
| 2008/0028138 | A1 | 1/2008 | Cypher |
| 2008/0028139 | A1 | 1/2008 | Cypher |
| 2008/0147714 | A1 | 6/2008 | Breternitz et al. |
| 2008/0183958 | A1 | 7/2008 | Cheriton |
| 2008/0215849 | A1 | 9/2008 | Scott |
| 2008/0281789 | A1 | 11/2008 | Kao et al. |
| 2009/0097654 | A1 | 4/2009 | Blake |
| 2009/0232139 | A1 | 9/2009 | Kelley |
| 2009/0274154 | A1 | 11/2009 | Kopelman et al. |
| 2009/0292721 | A1 | 11/2009 | Laursen et al. |
| 2010/0058027 | A1 | 3/2010 | Gong et al. |
| 2010/0195654 | A1 | 8/2010 | Jacobson et al. |
| 2011/0188503 | A1 | 8/2011 | Hewson |
| 2012/0136846 | A1 | 5/2012 | Song et al. |
| 2012/0143877 | A1 | 6/2012 | Kumar et al. |
| 2013/0111122 | A1* | 5/2013 | Song .................. G06F 13/1684 711/105 |
| 2013/0212296 | A1 | 8/2013 | Goel et al. |
| 2013/0246651 | A1 | 9/2013 | Keen et al. |
| 2014/0301394 | A1 | 10/2014 | Arad et al. |
| 2014/0307737 | A1 | 10/2014 | Levy et al. |
| 2014/0310307 | A1 | 10/2014 | Levy et al. |

OTHER PUBLICATIONS

International Preliminary Report on Patentability in International Application No. IB14/001368, dated Oct. 13, 2015 (8 pages).

International Search Report and Written Opinion in International Application No. PCT/IB2014/001368, dated Dec. 22, 2014 (12 pages).

NoSQL, Wikipedia, http://en.wikipedia.org/wiki/NoSQL#Key.E2. 80.93value_store, accessed Jan. 6, 2015 (9 pages).

Office Action in Chinese Patent Application No. 201480027410.3, dated Feb. 5, 2018 (13 pages).

Office Action in U.S. Appl. No. 14/250,621, dated Mar. 25, 2016 (15 pages).

Office Action in U.S. Appl. No. 14/250,621, dated Jun. 20, 2017 (22 pages).

Office Action in U.S. Appl. No. 14/250,621, dated Oct. 20, 2016 (20 pages).

Office Action in U.S. Appl. No. 14/250,833, dated Dec. 27, 2016 (27 pages).

Office Action in U.S. Appl. No. 14/250,833, dated Jun. 2, 2016 (24 pages).

Office Action in U.S. Appl. No. 14/250,833, dated Jan. 18, 2018 (57 pages).

Office Action in U.S. Appl. No. 14/250,833, dated Jul. 26, 2016 (59 pages).

Office Action in U.S. Appl. No. 14/250,833, dated Jul. 26, 2017 (59 pages).

Song et al., "Fast Hash Table Lookup Using Extended Bloom Filter: An Aid to Network Processing," Proceedings of the 2005 Conference on Applications, Technologies, Architectures, and Protocols for Computer Communications (SIGCOMM '05), pp. 181-192 (2005).

Venkatesh et al., "A High Performance Parallel IP Lookup Technique Using Distributed Memory Organization," Proceedings, ITCC 2004, International Conference on Information Technology: Coding and Computing, pp. 792-797 (2004).

Notice of Allowance in U.S. Appl. No. 14/250,833, dated Jun. 15, 2018 (10 pages).

Notice of Allowance in U.S. Appl. No. 14/250,621, dated Jan. 4, 2018 (15 pages).

* cited by examiner

STORING KEYS WITH VARIABLE SIZES IN A MULTI-BANK DATABASE

CROSS-REFERENCES TO RELATED APPLICATION

This application is a continuation of U.S. patent application Ser. No. 14/250,833, now U.S. Pat. No. 10,110,492, entitled "Exact Match Lookup with Variable Key Sizes," filed on Apr. 11, 2014, which is a divisional of U.S. patent application Ser. No. 14/250,621, now U.S. Pat. No. 9,967,187, entitled "Exact Match Lookup with Variable Key Sizes," filed on Apr. 11, 2014, which claims the benefit of U.S. Provisional Application No. 61/923,093, entitled "Exact Match with Variable Key Sizes," filed on Jan. 2, 2014, and U.S. Provisional Application No. 61/811,011, entitled "Exact Match with Variable Key Sizes," filed on Apr. 11, 2013. All of the applications referenced above are incorporated herein by reference in their entireties.

This application is related to U.S. patent application Ser. No. 13/966,962, now U.S. Pat. No. 9,269,439, entitled "Method and Apparatus For TCAM Based Lookup," filed on Aug. 14, 2013, U.S. patent application Ser. No. 13/737,608, now U.S. Pat. No. 9,171,030, entitled "Exact Match Lookup In Network Switch Devices," filed on Jan. 9, 2013, and U.S. patent application Ser. No. 14/012,834, now U.S. Pat. No. 9,537,771, entitled "Exact Match Hash Lookup Databases in Network Switch Devices," filed on Aug. 28, 2013. All of the applications referenced above are incorporated herein by reference in their entireties.

FIELD OF TECHNOLOGY

The present disclosure relates generally to network devices, and more particularly, to exact match lookups in network devices.

BACKGROUND

Network devices, such as network switches, bridges, routers, edge devices and the like, often employ lookup tables that store various types of information associated with packets processed by the network devices. The network devices often perform searches/lookups in the lookup tables to make various processing decisions or determinations (e.g., a classification for a packet, a port to which the packet is to be forwarded, etc.) when processing the packets. In general, a lookup for a packet is performed according to a key associated with the packet. The key typically includes information from a header of the packet and at times other information that may not be included in the header, such as an ingress interface. The key is used to search a table, for example, and information relevant to the packet (e.g., forwarding information for the packet, or information indicative of some other action) is retrieved from a table entry that is identified by the key.

Some lookup tables are implemented using content addressable memory (CAM) (e.g., ternary CAM (TCAM)), which is commonly used for "masked" searches/lookups. In recent years, however, network devices have increasingly begun to perform "exact match" lookups. While CAM based tables may be used for exact match lookups, they are generally less efficient for such lookups (e.g., in terms of area and power consumption) than random access memory (RAM) based tables, such as tables implemented using static RAM (SRAM). Exact match lookups are currently used to perform any of numerous different packet processing operations, such as packet classifications, making forwarding or routing decisions, quality of service classifications, policy control list applications, tunnel termination operations, etc. Moreover, due to the wide variety of possible processing operations, exact match lookups can require using a number of different types of keys having different key sizes. Typically, for example, bridging lookups based on a medium access control (MAC) address and virtual local area network (VLAN) identifier use a 60 bit key, forwarding and/or classification lookups based on a double VLAN tag use a 24 bit key, lookups for routing to IPv4 addresses use a 32 bit key, lookups for routing to IPv6 addresses use a 128 bit key, and so forth. To handle the various key sizes, some conventional network devices either pad all shorter keys to the bit length of the largest supported key size, or provide separate lookup tables stored in different memories, with each table being indexed only by keys of a single, fixed size. Both techniques, however, are generally inefficient with respect to utilization of memory resources, which can ultimately increase circuit area and/or power consumption. With respect to the former technique, for example, even relatively short keys occupy the same amount of lookup table memory as a long key. Moreover, because the number of entries that will be required for each table/key size, and/or the distribution of key sizes, is typically not known a priori, a system designer using the latter technique is generally unable to determine the amount of entries per lookup table/key size that will efficiently utilize lookup memory resources.

SUMMARY OF THE DISCLOSURE

In an embodiment, a method for populating an exact match lookup table in a network device includes: generating a lookup value to be stored in a database of the network device, the database being distributed among a plurality of memory banks; determining, based on a size of the lookup value, that the lookup value is to be stored across a set of two or more memory banks among the plurality of memory banks, the set of memory banks including at least a first memory bank and a second memory bank; selecting a first hash function from among a plurality of hash functions respectively associated with the plurality of memory banks, wherein the first hash function is for determining locations for storing lookup values entirely in the first memory bank, and wherein the plurality of hash functions further includes a second hash function for determining locations for storing lookup values entirely in the second memory bank; performing a hash operation on the lookup value using the first hash function associated with the first memory bank to determine a memory location for storing the lookup value; storing a first segment of the lookup value in the first memory bank at the memory location determined using the first hash function associated with the first memory bank; and storing a second segment of the lookup value in the second memory bank at the memory location determined using the first hash function associated with the first memory bank.

In another embodiment, a network device comprises: a plurality of interfaces associated with network communication links; a lookup memory storing a database distributed among a plurality of memory banks; and a packet processor coupled to the plurality of interfaces, the packet processor being configured to process network packets received via at least some of the plurality of interfaces. The packet processor comprises: a lookup value generation unit configured to generate a lookup value to be stored in the database, and a lookup value insertion unit. The lookup value insertion unit is configured to: determine that the lookup value is to be stored across a set of multiple memory banks among the plurality of memory banks, the set of memory banks including a first memory bank and a second memory bank; select a first hash function from among a plurality of hash functions respectively associated with the plurality of memory banks, wherein the first hash function is for determining locations for storing lookup values entirely in the first memory bank, and wherein the plurality of hash functions further includes a second hash function for determining locations for storing lookup values entirely in the second memory bank; perform a hash operation on the lookup value using the first hash function associated with the first memory bank to determine a memory location for storing the lookup value; store a first segment of the lookup value in the first memory bank at the memory location determined using the first hash function associated with the first memory bank; and store a second segment of the lookup value in the second memory bank at the memory location determined using the first hash function associated with the first memory bank.

DETAILED DESCRIPTION

In embodiments described below, lookup keys having different sizes (e.g., bit lengths) are efficiently stored in a unified memory (e.g., a common set of memory banks) without requiring that shorter keys be padded to the length of the longest supported key. In some of these embodiments, a multi-hash, exact match lookup table is distributed across multiple memory banks. In an embodiment, each memory bank, or each of one or more groups of multiple memory banks, is accessed (e.g., to populate, or search, the part of the lookup table stored in the bank(s)) using a different hash function. According to a first exact match lookup technique, in an embodiment, hash tables are defined according to key size, with each hash table being a virtual/logical grouping of one or more of the memory banks that is accessed (for key insertion and key searching) using a single hash function. In some of these embodiments, and subject to the availability of table entries, keys having a minimum size can be inserted into a hash table corresponding to any one of the memory banks, while larger keys can be inserted into hash tables that correspond to contiguous blocks of two or more of the memory banks. In some embodiments, each hash table corresponding to a larger key is restricted to a particular set of the memory banks based on the key size, and the particular hash function used to access the hash table depends on which set of memory banks is utilized. In one embodiment, for example, each hash table is accessed using a hash function associated with a first memory bank of the grouping of one or more memory banks corresponding to that hash table.

According to a second exact match lookup technique, in an embodiment, larger keys can be inserted into the various memory banks in a more flexible manner (e.g., without being restricted to contiguous blocks of memory banks), with pointers being used to indicate the relation between various hashed key segments in the different memory banks. In one such embodiment, lookups are performed by hashing a larger key with the hash functions corresponding to each of the memory banks, identifying any matching segments in the memory banks, and using one or more pointers associated with the matching segments (and other information, such as segment number and/or key size, in some embodiments) to reconstruct the appropriate entry that provides an exact match for the larger key.

Figure 1:
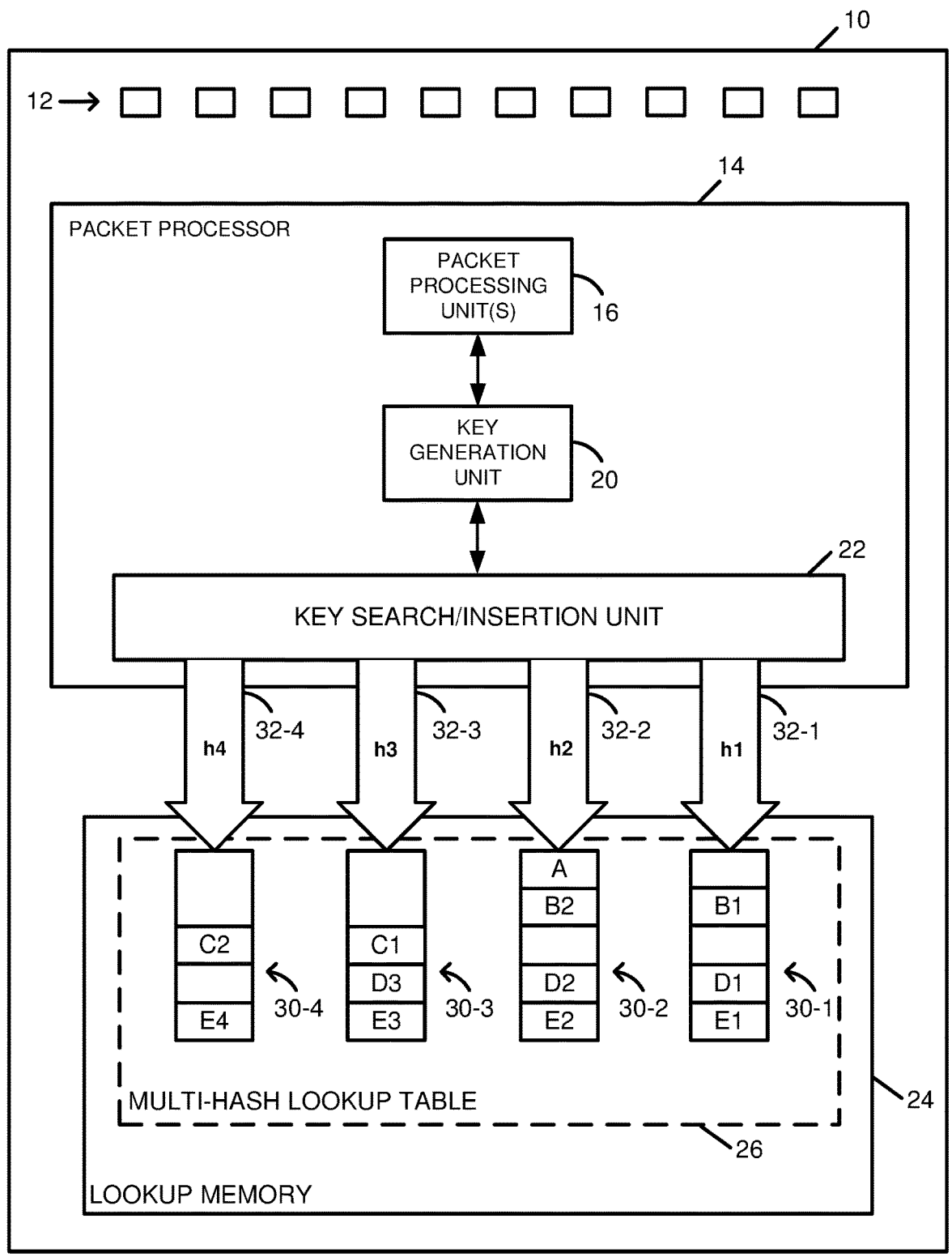
FIG. 1 is a block diagram of an example network device that utilizes a multi-hash lookup table for performing various lookup operations, according to an embodiment.

FIG. 1 is a highly simplified block diagram of an example network device 10 that utilizes variable key size lookup techniques described herein, according to an embodiment. The network device 10 is generally a computer networking device that connects two or more computer systems, network segments, subnets, and so on. In various embodiments, the network device 10 is a bridge device, router device, switch device, or any other suitable network device configured to operate within a networked environment. The network device 10 shown in the embodiment of FIG. 1 includes ports 12. Generally, in some embodiments, ports 12 include physical, virtual and/or logical interfaces, such as physical ports, virtual ports, tunnel interfaces, etc. In some embodiments, each of the ports 12 is a bidirectional port that can act as either an ingress port or an egress port. In other embodiments, some or all of the ports 12 are dedicated to be either ingress ports or egress ports. While FIG. 1 only shows ten ports, in other embodiments network device 10 includes more than ten ports or fewer than ten ports.

The network device 10 also includes a packet processor 14. The packet processor 14 is generally configured to process network packets received and/or transmitted via one or more of ports 12. In various embodiments, packet processor 14 includes one or more packet processing units 16 configured to perform packet processing operations on received packets, and/or on descriptors representing the received packets. At least one of packet processing unit(s) 16 performs processing operations that require, in at least some scenarios, using packet information (e.g., packet header and/or descriptor information) to perform searches/lookups in order to determine actions to be taken on, or with respect to, the packets. In one embodiment, for example, packet processing unit(s) 16 include a bridging unit that performs lookups for Layer 2 forwarding of packets to one or more egress ports of ports 12, a classification unit that performs lookups to determine which policy to apply to received packets, a routing unit that performs lookups for Layer 3 routing of packets, a tunnel termination unit that performs lookups for de-encapsulation of tunneled packets, and/or one or more other units that perform lookups for other purposes. In some embodiments, two or more of packet processing units 16 perform lookups using different size keys. In one embodiment, for example, a bridging unit performs lookups using 60 bit keys corresponding to MAC addresses and VLAN identifiers/tags, a forwarding and/or classification unit performs lookups using 24 bit keys corresponding to double VLAN tags, a tunnel termination unit performs lookups using key sizes that are appropriate for the particular tunnel protocol/type (e.g., MACinMAC, VPLS, TRILL, VXLAN, etc.), etc. Additionally or alternatively, in some embodiments, at least one of packet processing unit(s) 16 is individually configured to perform lookups using keys of different sizes. In one embodiment, for example, a routing unit is configured to perform multiple types of lookups that use different key sizes, including lookups using 32 bit keys corresponding to IPv4 addresses, lookups using 128 bit keys corresponding to IPv6 addresses, and lookups using keys that are lengthened by adding virtual router forwarding (VRF) indices to the IPv4 and/or IPv6 addresses.

To perform at least some of the required lookups, packet processor 14 includes a key generation unit 20, a key search/insertion unit 22, and a lookup memory 24 storing a multi-hash lookup table 26. In various embodiments, key generation unit 20 and/or key search/insertion unit 22 are coupled to each unit, of packet processing unit(s) 16, that performs a lookup, are coupled to each of a subset of the units of packet processing unit(s) 16 that perform lookups, or are configured to serve all of packet processing unit(s) 16.

To determine actions to be performed on or with respect to a packet, key generation unit 20 uses packet information to generate a key for the packet. In an embodiment, key generation unit 20 generates the key based on the packet header information needed to decide the appropriate action, such as a MAC address, VLAN or double VLAN tag, or IPv4 or IPv6 address, for example. Alternatively or additionally, in an embodiment, key generation unit 20 generates the key based on non-header information, such as the interface (e.g., of ports 12) via which the packet ingresses to the network device 10. Key search/insertion unit 22 utilizes the generated key to search the multi-hash lookup table 26, and returns (to the unit of packet processing unit(s) 16 that initiated the search) packet processing information that the unit can utilize to perform the desired processing operations. In an embodiment, key search/insertion unit 22 not only searches for entries in multi-hash lookup table 26, but also populates multi-hash lookup table 26 with new entries (e.g., inserts keys and values/actions into multi-hash lookup table 26), and/or removes old entries (e.g., based on aging criteria).

As will be described in more detail below, multi-hash lookup table 26 stores entries corresponding to different key sizes. In various embodiments, each different key size, or each of at least some of the different key sizes, corresponds to a different type of search/lookup, and multi-hash lookup table 26 is therefore a multi-purpose database. In one embodiment, for example, multi-hash lookup table 26 stores entries associated with forwarding actions, as well as entries associated with tunnel termination actions, and therefore serves as both a forwarding table and a tunnel termination table. In other embodiments, each different key size corresponds to a same general type of search/lookup. In some embodiments, for example, multi-hash lookup table 26 stores only entries associated with routing actions (e.g., actions corresponding to 32-bit IPv4 addresses and actions corresponding to 128-bit IPv6 addresses, in an embodiment).

In the embodiment shown in FIG. 1, the multi-hash lookup table 26 is subdivided into four hash table portions stored in four different memory banks 30-1 through 30-4 of lookup memory 24. In one embodiment, each of memory banks 30-1 through 30-4 is a different physical memory bank within lookup memory 24. The lookup memory 24 (including memory banks 30-1 through 30-4) is a static random access memory (SRAM), in an embodiment. In other embodiments, the lookup memory 24 is a different, suitable memory, such as dynamic RAM (DRAM), for example. In an embodiment, each of the hash table portions in memory banks 30-1 through 30-4 is accessed (for key searching or key insertion purposes) using a different, corresponding one of hash functions 32-1 through 32-4. In an embodiment, the number of value/action entries that can be stored in multi-hash lookup table 26 is equal to the maximum number of minimum size keys that can be stored in multi-hash lookup table 26. In some embodiments, the values/actions of multi-hash lookup table 26 include pointers to attributes associated with a key, or include data representing the attributes themselves.

Packet processor 14 includes, or is included within, one or more tangible/physical processors. In a first embodiment, for example, packet processor 14 includes a plurality of software-driven processors, arranged as stages in a pipeline, that are configured to process packets passing through the pipeline. In an embodiment, each stage of the pipeline receives a packet, a processing context, and code needed to perform one or more processing operations at the stage based on the context. In one such embodiment, packet processing unit(s) 16 is/are implemented as respective pipeline stages. Moreover, in an embodiment, key generation unit 20 and/or key search/insertion unit 22 is/are implemented as one or more accelerators (e.g., one or more hardware accelerator circuits) external to the pipeline stages.

In a second embodiment, packet processor 14 includes a plurality of software-driven, run-to-completion processors/cores, with each core being configured to perform substantially all of the processing for a respective packet before processing a subsequent packet. In one such embodiment, packet processing unit(s) 16 is/are implemented as respective software modules within a single core of packet processor 14. Moreover, in an embodiment, key generation unit 20 and/or key search/insertion unit 22 is/are implemented as one or more accelerators (e.g., one or more hardware accelerator circuits) external to the cores of packet processor 14. In an embodiment, key generation unit 20 and/or key search/insertion unit 22 is/are utilized by multiple cores to perform lookup operations associated with different packets.

In some of the first and second embodiments described above, the software-driven processors are configured to read and execute instructions stored on a tangible, non-transitory, computer-readable memory (e.g., a read-only memory (ROM), random access memory (RAM), etc.). In some embodiments, the instructions include computer-readable instructions that, when executed by the processors, cause the processors to perform any of the various actions of packet processor(s) 16 described herein.

In a third embodiment, packet processor 14 includes a packet processing pipeline implemented in hardware, such as one or more application-specific integrated circuits (ASICs) or any other suitable type(s) of hardware circuit(s). In one such embodiment, packet processing unit(s) 16 is/are implemented as respective pipeline stages. Moreover, in an embodiment, key generation unit 20 and/or key search/insertion unit 22 is/are implemented as one or more circuits external to the pipeline stages.

Operation of key search/insertion unit 22, with respect to both populating and searching multi-hash lookup table 26, will now be described for two alternative techniques/embodiments. A first exact match lookup technique, which in some embodiments is particularly well-suited for applications in which most keys are expected to have a minimum key size, is described with reference to the example embodiment of FIG. 2. A second, alternative exact match lookup technique, which in some embodiments provides a more general solution that is agnostic to the distribution of key sizes, is described with reference to the example embodiment of FIG. 3.

Figure 2:
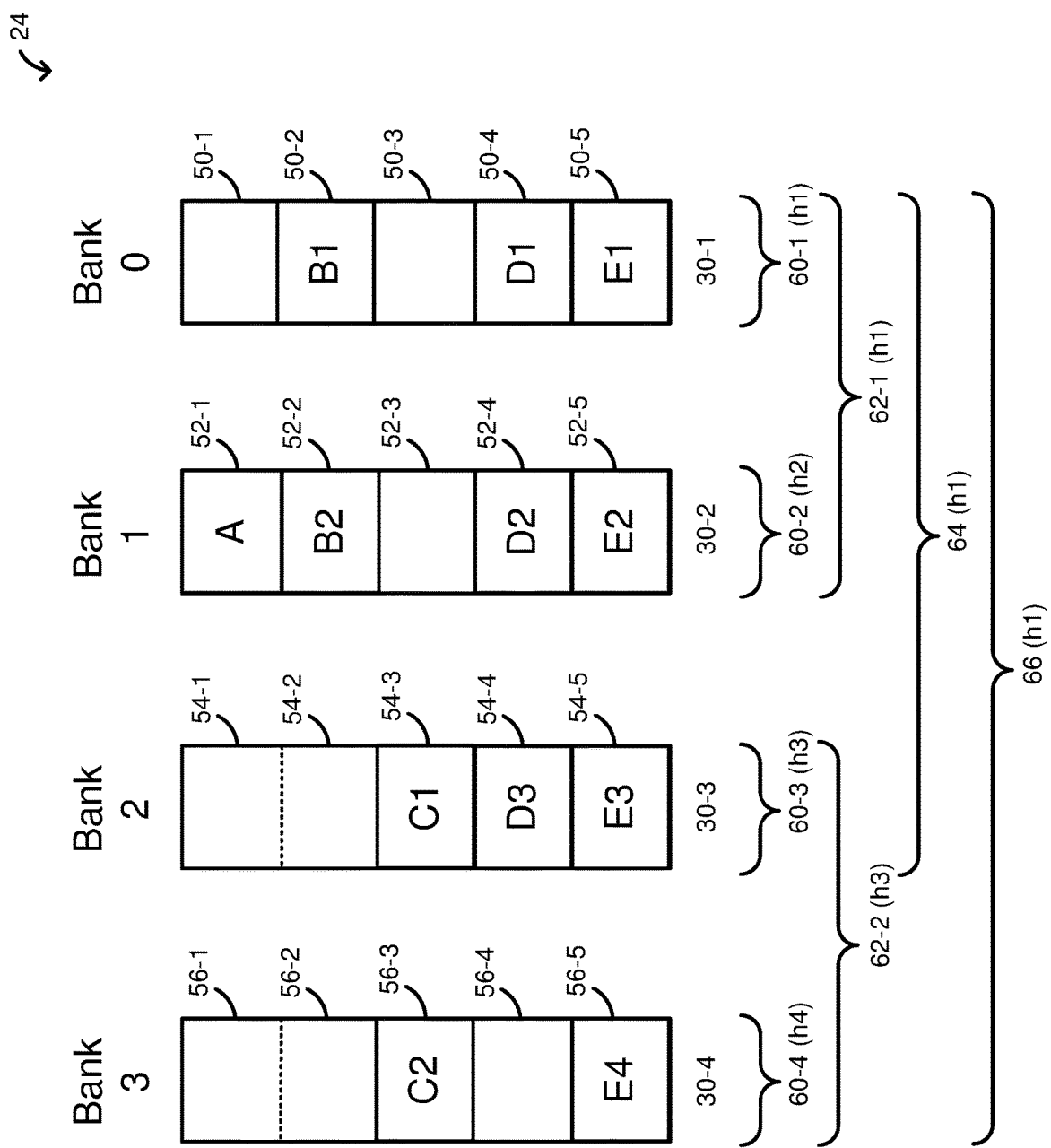
FIG. 2 is a block diagram of example memory banks used to store the multi-hash lookup table of FIG. 1 in accordance with a first exact match lookup technique, according to an embodiment.

Referring first to FIG. 2, which illustrates one example embodiment of the first exact match lookup technique, it is seen that each of memory banks 30-1 through 30-4 of lookup memory 24 stores a respective portion of multi-hash lookup table 26, with each memory bank 30-1 through 30-4 being configured to store up to one hashed key segment in each of a finite number of hash table addresses. As will be clear from the description that follows, a "hashed key segment" corresponds to the entire key for keys having a minimum size, or to a portion of the key for keys having a larger size, in an embodiment. In an embodiment, each address of the various hash table portions corresponds to a single hash value when applying the corresponding hash function, and each of memory banks 30-1 through 30-4 has a width equal to the size (bit count) of a single hashed key segment.

In the embodiment of FIG. 2, the hash table portion of memory bank 30-1 includes five addresses 50-1 through 50-5 each able to hold a single hashed key segment, the hash table portion of memory bank 30-2 includes five addresses 52-1 through 52-5 each able to hold a single hashed key segment, the hash table portion of memory bank 30-3 includes five addresses 54-1 through 54-5 each able to hold a single hashed key segment, and the hash table portion of memory bank 30-4 includes five addresses 56-1 through 56-5 each able to hold a single hashed key segment. The multi-hash lookup table 26 of FIG. 2 (and FIG. 1) is shown as including only four hash table portions (stored in four memory banks 30), including five addresses each, merely to facilitate explanation. In other embodiments, however, multi-hash lookup table 26 includes other numbers of hash table portions stored in other numbers of memory banks 30 (e.g., 2, 3, 5, 6, etc.), and/or each hash table portion includes a different number of addresses able to hold hashed key segments (e.g., 256, 1000, etc.).

When operating according to the first exact match lookup technique and the example embodiment of FIG. 2, the key search/insertion unit 22 populates multi-hash lookup table 26 by receiving both a key (e.g., from key generation unit 20) and associated information that is to be inserted into an entry of multi-hash lookup table 26. In one embodiment, for example, the key includes both a MAC address and a VLAN identifier of a packet, and the information associated with the key includes identifiers of one or more egress ports of ports 12 to which packets destined for that MAC address (and having that VLAN identifier) are to be forwarded. In an embodiment, key generation unit 20 also generates an indicator of the key size (e.g., a bit count, or an indicator representing a size range, etc.), and provides the indicator to key search/insertion unit 22 along with, or as a part of, the key.

In an embodiment, key search/insertion unit 22 identifies/selects one or more hash tables based on the key size (e.g., using a key size indicator provided by key generation unit 20), with each different hash table corresponding to a different hash function. In one embodiment, for example, key search/insertion unit 22 identifies/selects four hash tables 60-1 through 60-4, each stored in a different one of memory banks 30-1 through 30-4, and each corresponding to a different one of hash functions 32-1 through 32-4 (FIG. 1), when inserting keys having a minimum key size. In an embodiment, the minimum key size is the size of those keys that are hashed to only a single hashed key segment (of hashed key segments 50, 52, 54 and 56) when inserted into multi-hash lookup table 26. In some embodiments, key generation unit 20 provides padding to ensure that all keys have at least the minimum key size. In some embodiments and scenarios where a minimum size key is to be inserted, key search/insertion unit 22 accesses each of hash tables 60-1 through 60-4 by hashing the entire key using the respective one of hash functions 32-1 through 32-4, and inserts the hashed key into one of hash tables 60 if no collision will result (e.g., if that hash table does not already include a hashed key segment of a different key at the calculated address/hash value, in one embodiment). In an embodiment, key search/insertion unit 22 also stores, in the entry, information indicating that the key is a minimum size key. FIG. 2 illustrates a scenario in which a key having the minimum key size is successfully inserted into hash table 60-2 as hashed key segment "A," at the address 52-1.

In some embodiments, key search/insertion unit 22 applies hash functions 32-1 through 32-4 to the key (and determines whether insertion into the corresponding one of hash tables 60-1 through 60-4 is possible) one at a time, and performs the remaining hash functions only if the current hash operation does not result in key insertion. In other embodiments, key search/insertion unit 22 applies each of hash functions 32-1 to 32-4 to the key, and checks to see whether each of hash tables 60-1 through 60-4 can store the key, in parallel. In some embodiments and scenarios in which more than one of hash tables 60-1 through 60-4 has an available address, key search/insertion unit 22 inserts the key into the most populated one of hash tables 60-1 through 60-4. Additionally or alternatively, in some embodiments, key search/insertion unit 22 utilizes a "cuckoo" algorithm, in which the key is inserted even in the presence of a collision, so long as the earlier stored key can be moved to a new hash table. In some embodiments, any suitable key insertion technique(s) or algorithm(s) described in U.S. patent application Ser. No. 13/737,608, and/or U.S. patent application Ser. No. 14/012,834, is/are implemented in conjunction with the techniques described herein.

For keys that are twice the minimum key length (or are padded to be twice the minimum key length, e.g. by key generation unit 20), in an embodiment, key search/insertion unit 22 identifies/selects two hash tables 62-1 and 62-2, each corresponding to a different pair of memory banks 30-1 through 30-4, and each corresponding to a different one of hash functions 32-1 through 32-4. In an embodiment, the hash function used to access the pairs of memory banks corresponding to hash tables 62-1 and 62-2, when a key having twice the minimum key length is searched, is the hash function corresponding to the first memory bank that is used to store the hash table. In the example embodiment of FIG. 2, for example, the hash function for hash table 62-1 is the hash function corresponding to memory bank 30-1 (i.e., hash function 32-1), and the hash function for hash table 62-2 is the hash function corresponding to memory bank 30-3 (i.e., hash function 32-3). In other embodiments, a different hash function is used for each hash table (such as the last memory bank that is used to store the hash table, for example).

In some embodiments and scenarios where a key that is double the minimum key size is to be inserted, key search/insertion unit 22 accesses hash table 62-1 by hashing the entire key using the hash function 32-1 to access the hash table portion stored in memory bank 30-1, and also by hashing the entire key using the hash function 32-1 to access the hash table portion stored in memory bank 30-2. Similarly, in an embodiment, key search/insertion unit 22 accesses hash table 62-2 by hashing the entire key using the hash function 32-3 to access the hash table portion stored in memory bank 30-3, and also by hashing the entire key using the hash function 32-3 to access the hash table portion stored in memory bank 30-4. The hashed key is then inserted into one of hash tables 62-1 or 62-2, in the form of two adjacent hashed key segments, if no collision will result (e.g., if neither of the constituent hash table portions of the hash table includes a hashed key segment at the resulting address/hash value, in one embodiment). In an embodiment, key search/insertion unit 22 also stores, in the entry, information indicating that the key is twice the minimum size. FIG. 2 illustrates a scenario in which a first key having twice the minimum key size is successfully inserted into hash table 62-1 as hashed key segments "B1" and "B2," at the addresses 50-2 and 52-2, respectively, and a second key having twice the minimum key size is successfully inserted into hash table 62-2 as hashed key segments "C1" and "C2," at the addresses 54-3 and 56-3, respectively. As is seen in the example embodiment and scenario of FIG. 2, the use of the same hash function for each hash table portion of a particular hash table (e.g., the use of hash function 32-1 for the hash table portions stored in memory banks 30-1 and 30-2) causes each hashed key segment to be stored at the same address/hash value within each hash table portion.

In some embodiments, key search/insertion unit 22 applies hash functions 32-1 and 32-3 to the key (and determines whether insertion into the corresponding one of hash tables 62-1 or 62-2 is possible) one at a time, and performs the second hash function 32-3 only if the first hash function 32-1 does not result in key insertion. In other embodiments, key search/insertion unit 22 applies both of hash functions 32-1 and 32-3 to the key, and checks to see whether both of hash tables 62-1 and 62-2 can store the key, in parallel. In some embodiments and scenarios in which both of hash tables 62-1 and 62-2 have available addresses within the constituent hash table portions, key search/insertion unit 22 inserts the key into the most populated one of hash tables 62-1 and 62-2. Additionally or alternatively, in some embodiments, key search/insertion unit 22 utilizes a "cuckoo" algorithm, in which the key is inserted even in the presence of a collision, so long as the earlier stored key can be moved to a new hash table. In some embodiments, any suitable key insertion technique(s) or algorithm(s) described in U.S. patent application Ser. No. 13/737,608, and/or U.S. patent application Ser. No. 14/012,834, is/are implemented in conjunction with the techniques described herein.

For keys that are three times the minimum key length (or are padded to be three times the minimum key length, e.g. by key generation unit 20), in an embodiment, key search/insertion unit 22 identifies/selects hash table 64 corresponding to memory banks 30-1 through 30-3 and one of hash functions 32-1 through 32-4. In an embodiment, the hash function used to access each of the three memory banks corresponding to hash table 64, when a key having three times the minimum key length is searched, is the hash function corresponding to the first memory bank that is used to store the hash table. In the example embodiment of FIG. 2, for example, the hash function for hash table 64 is the hash function corresponding to memory bank 30-1 (i.e., hash function 32-1). In other embodiments, a different hash function is used for each hash table (such as the last memory bank that is used to store the hash table, for example). In some embodiments and scenarios where a key that is three times the minimum key size is to be inserted, key search/insertion unit 22 accesses hash table 64 by hashing the entire key using the same hash function 32-1 to access each of the three hash table portions stored in memory banks 30-1 through 30-3. The hashed key is then inserted into hash table 64, in the form of three adjacent hashed key segments, if no collision will result (e.g., if none of the three constituent hash table portions of the hash table includes a hashed key segment at the resulting address/hash value, in an embodiment). In some embodiments, key search/insertion unit 22 utilizes a "cuckoo" algorithm, in which the key is inserted even in the presence of a collision, so long as the earlier stored key can be moved to a new hash table. In some embodiments, any suitable key insertion technique(s) or algorithm(s) described in U.S. patent application Ser. No. 13/737,608, and/or U.S. patent application Ser. No. 14/012,834, is/are implemented in conjunction with the techniques described herein. In an embodiment, key search/insertion unit 22 also stores, in the entry, information indicating that the key is three times the minimum size. FIG. 2 illustrates a scenario in which a key having three times the minimum key size is successfully inserted into hash table 64 as hashed key segments "D1," "D2" and "D3," at the addresses 50-4, 52-4 and 54-4, respectively. Again, the use of the same hash function for each hash table portion of a particular hash table (i.e., the use of hash function 32-1 for each of the hash table portions stored in memory banks 30-1 through 30-3) causes each hashed key segment to be stored at the same address/hash value within each hash table portion.

For keys that are four times the minimum key length (or are padded to be four times the minimum key length, e.g. by key generation unit 20), in an embodiment, key search/insertion unit 22 identifies/selects hash table 66 corresponding to memory banks 30-1 through 30-4 and one of hash functions 32-1 through 32-4. In an embodiment, the hash function used to access each of the four memory banks corresponding to hash table 66, when a key having four times the minimum key length is searched, is the hash function corresponding to the first memory bank that is used to store the hash table. In the example embodiment of FIG. 2, for example, the hash function for hash table 66 is the hash function corresponding to memory bank 30-1 (i.e., hash function 32-1), because memory bank 30-1 is the first memory bank in which a portion of the hashed key is stored. In other embodiments, a different hash function is used for each hash table (such as the last memory bank that is used to store the hash table, for example). In some embodiments and scenarios where a key that is four times the minimum key size is to be inserted, key search/insertion unit 22 accesses hash table 66 by hashing the entire key using the same hash function 32-1 to access each of the four hash table portions stored in memory banks 30-1 through 30-4. The hashed key is then inserted into hash table 66, in the form of four adjacent hashed key segments, in an embodiment, if no collision will result at the corresponding addresses in any of the memory banks 30 (e.g., if none of the four constituent hash table portions of the hash table includes a hashed key segment at the resulting address/hash value, in one embodiment). In some embodiments, key search/insertion unit 22 utilizes a "cuckoo" algorithm, in which the key is inserted even in the presence of a collision, so long as the earlier stored key can be moved to a new hash table. In some embodiments, any suitable key insertion technique(s) or algorithm(s) described in U.S. patent application Ser. No. 13/737,608, and/or U.S. patent application Ser. No. 14/012,834, is/are implemented in conjunction with the techniques described herein. In an embodiment, key search/insertion unit 22 also stores, in the entry, information indicating that the key is four times the minimum size. FIG. 2 illustrates a scenario in which a key having four times the minimum key size is successfully inserted into hash table 66 as hashed key segments "E1," "E2," "E3" and "E4," at the addresses 50-5, 52-5, 54-5 and 56-5, respectively. Once more, the use of the same hash function for each hash table portion of a particular hash table (i.e., the use of hash function 32-1 for each of the hash table portions stored in memory banks 30-1 through 30-4) causes each hashed key segment to be stored at the same address/hash value within each hash table portion.

As seen in FIG. 2, in an embodiment, the first exact match lookup technique can select, in some scenarios, different hash functions to access a single one of the memory banks 30, with the selection being based on the size of the lookup key. In the example embodiment of FIG. 2, for example, memory bank 30-2 is accessed using hash function 32-2 when searching lookup keys having the minimum key size, but using hash function 32-1 when searching lookup keys have two, three or four times the minimum key size. As another example, in an embodiment, memory bank 30-4 is accessed using hash function 32-4 when searching lookup keys having the minimum key size, using hash function 32-3 when searching lookup keys have two times the minimum key size, and using hash function 32-1 when searching lookup keys having four times the minimum key size.

In some embodiments, the hash tables provided for a particular key size can overlap in terms of the memory banks that store the corresponding hashed key segments. In the example embodiment FIG. 2, however, the various hash tables are restricted to particular memory banks 30 such that no two hash tables for a single key size are stored, or partially stored, in a same memory bank. For example, keys that are twice the minimum key size cannot be inserted into a hash table stored in memory banks 30-2 and 30-3, and keys that are three times the minimum key size cannot be inserted into a hash table stored in memory banks 30-2, 30-3 and 30-4, in an embodiment. More generally, in some embodiments having N memory banks similar to memory banks 30, the hash table(s) for keys having a size K times the minimum key size (K being an integer, and K[i] being the i-th segment of the hashed key) is/are arranged such the first hashed key segment (K[0]) for each of the one or more hash tables is/are stored at B[0], B[K], B[2K], B[3K], . . . , B[max_location], where B[i] is the i-th memory bank, where max_location is equal to N−K−mod(N/K), and where the hashed key segment K[i] of each hash table is stored at the memory bank that is i memory banks above the memory bank that stores the K[0] hashed key segment of that hash table. In some embodiments, arranging hash tables in this manner prevents false positives (i.e., scenarios in which a matching entry is erroneously returned for a key that does not truly have an entry in the multi-hash lookup table). One example embodiment that applies the general rules above corresponds to the various hash tables seen in FIG. 2. As another example, application of the general rules to an embodiment having six memory banks (i.e., N=6) results in three non-overlapping hash tables for keys that are double the minimum key size, two non-overlapping hash tables for keys that are three times the minimum key size, one hash table for keys that are four times the minimum key size, one hash table for keys that are five times the minimum key size, and one hash table for keys that are six times the minimum key size. Of course, in any of these embodiments, no hash tables need be defined or provided for key sizes that are not expected to be utilized.

As noted above, in some embodiments, key search/insertion unit 22 inserts keys based on which of the hash tables are most populated, and/or inserts keys using a cuckoo algorithm. In some embodiments in which a cuckoo algorithm is implemented, key search/insertion unit 22 can evacuate an existing entry to store a new key/entry regardless of whether the old key is smaller, equal to, or larger than the new key. In one embodiment and scenario, for example, key search/insertion unit 22 can insert a new key having twice the minimum key size into a pair of addresses in adjacent memory banks by evacuating minimum size keys at one or both of those addresses, by evacuating a key at the same pair of addresses that likewise has twice the minimum key size, or by evacuating a key at the same pair of addresses (and an additional one or more addresses) that has at least three times the minimum key size.

In some embodiments of the first exact match lookup technique, key search/insertion unit 22 performs searches/lookups using the same hash tables and hash functions (i.e., as defined by key size) as described above with respect to table population/key insertion. In one embodiment, for example, hash tables 60 are searched for minimum size keys, hash tables 62 are searched for keys having twice the minimum size, hash table 64 is searched for keys having three times the minimum size, and hash table 66 is searched for keys having four times the minimum size. In one embodiment in which multiple hash tables are provided for a particular key size, each hash table is searched in parallel when searching with a key having that key size. In the example embodiment of FIG. 2, for example, hash tables 62-1 and 62-2 are searched in parallel when performing a lookup for a key having twice the minimum key size. In an alternative embodiment, the hash tables are searched in a serial manner until a matching entry is found.

In an embodiment, a lookup match is achieved if all hashed key segments calculated for a particular key match all of the entries stored at the corresponding addresses of a particular hash table. In one embodiment and scenario in which a key having twice the minimum key size is used to perform a lookup, for example, a match is returned when the hash function 32-3 results in hashed key segments C1 and C2 at the addresses 54-3 and 56-3, respectively. In some embodiments, each hashed key segment is stored along with information indicating the size of the key corresponding to the entry, in order to reduce or eliminate false positives. In one embodiment and scenario, for example, the hashed key segments "B1" and "B2" (at addresses 50-2 and 52-2, respectively) are each stored in the respective memory bank along with information indicating that the segment belongs to an entry of a key that is double the minimum size. In an embodiment, key search/insertion unit 22 retrieves this key size information when detecting a match, and uses the key size information to determine whether a match is valid. In one embodiment and scenario in which key search/insertion unit 22 uses a minimum size key to perform a lookup, for example, applying the hash function 32-2 results in the address/hash value 52-2, which also happens to correspond to one of the hash locations ("B2") for a larger key that was already stored in multi-hash lookup table 26. In this embodiment/scenario, key search/insertion unit 22 retrieves the key size information associated with hashed key segment "B2," and uses that information to determine that the match is not valid for the minimum size key search.

Figure 3:
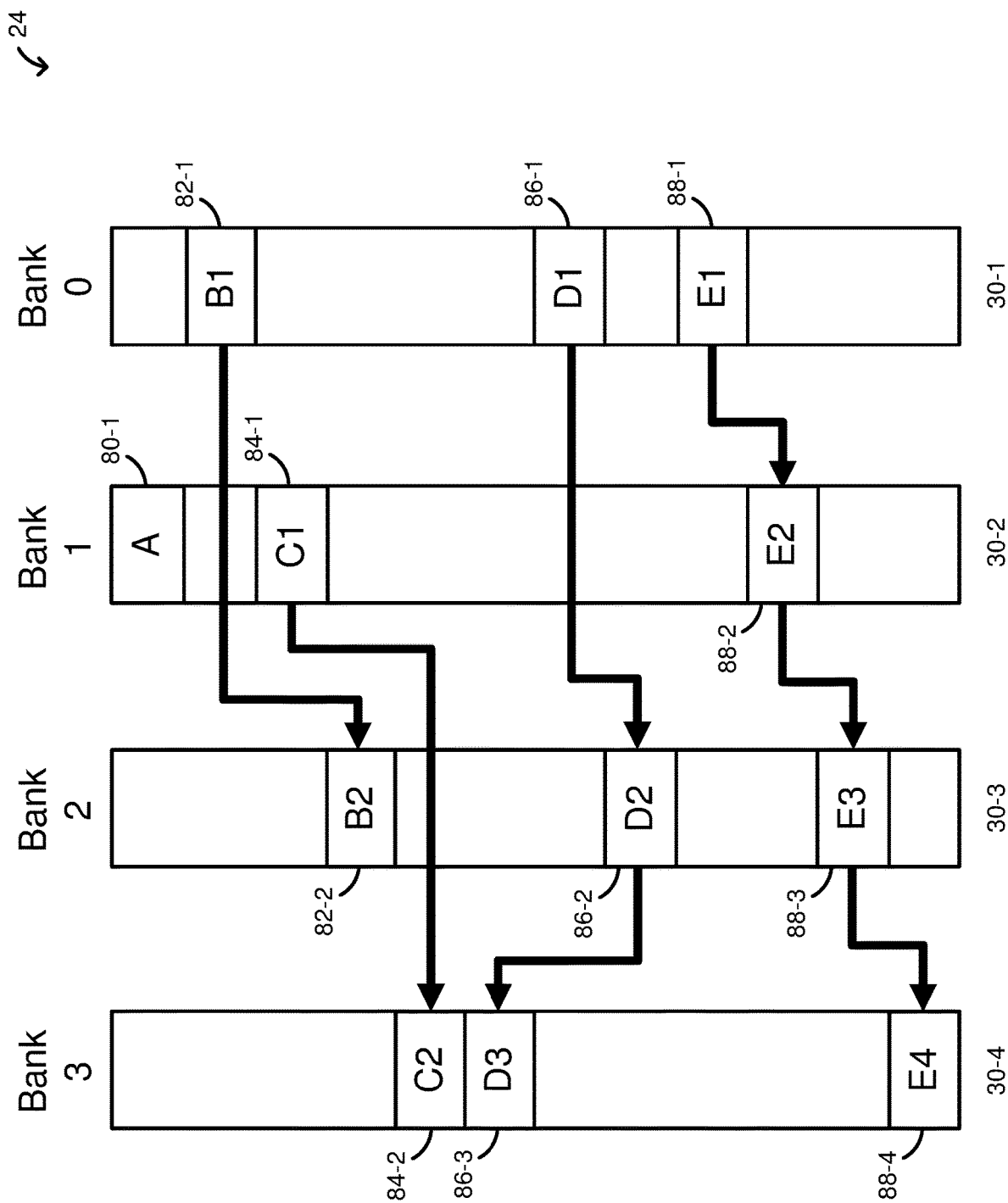
FIG. 3 is a block diagram of example memory banks used to store the multi-hash lookup table of FIG. 1 in accordance with a second exact match lookup technique, according to an embodiment.

Referring next to FIG. 3, which illustrates one example embodiment of the second exact match lookup technique, it is seen that each of memory banks 30-1 through 30-4 of lookup memory 24 again stores a respective portion of multi-hash lookup table 26, with each memory bank 30-1 through 30-4 again being configured to store up to one hashed key segment in each of a finite number of hash table addresses. In an embodiment, each address of the various hash table portions corresponds to a single hash value when applying the corresponding hash function, and each of memory banks 30-1 through 30-4 has a width equal to the size (bit count) of a single hashed key segment.

Unlike FIG. 2, FIG. 3 does not show all possible address locations in each hash table portion, but rather illustrates only some of the various addresses that are actively being used to store hashed key segments in a particular scenario. As with FIG. 2 and the first exact match lookup technique, however, it is noted that each hash table portion can include any suitable number of addresses each able to hold a hashed key segment (e.g., 256, 1000, etc.), in various different embodiments. Also as in FIG. 2 and the first exact match lookup technique, other embodiments of multi-hash lookup table 26 include other numbers of hash table portions stored in other numbers of memory banks 30 (e.g., 2, 3, 5, 6, etc.), When operating according to the second exact match lookup technique and the example embodiment of FIG. 3, key search/insertion unit 22 populates multi-hash lookup table 26 by first receiving a key and associated information that is to be inserted into an entry of multi-hash lookup table 26 (such as any one of the key types and/or sizes described above in connection with FIG. 2 and the first exact match lookup technique, for example). In an embodiment, key generation unit 20 also generates an indicator of the key size (e.g., a bit count, or an indicator representing a size range, etc.), and provides the indicator to key search/insertion unit 22 along with, or as a part of, the key.

In an embodiment, key search/insertion unit 22 applies each of hash functions 32-1 through 32-4 to a received key, regardless of key size, and determines which of the corresponding hash table portions has an available address. If, for a key that is K times larger than the minimum size key, the hashed values/address is available in at least K different banks of memory banks 30, the key search/insertion unit 22 inserts the respective hashed key segment into each of K different memory banks 30. Whereas the first exact match lookup technique (for the example embodiment of FIG. 2) inserts the hashed key segments of larger keys only into hash table portions stored in adjacent memory banks 30, in at least some embodiments the second exact match lookup technique allows the hashed key segments of larger keys to be stored in addresses of any available memory bank 30 (up to one address per memory bank 30). In some of these embodiments, relaxing the restrictions on acceptable hashed key segment locations allows the lookup memory 24 to be utilized more efficiently, at least in terms of space utilization. In an embodiment, however, key search/insertion unit 22 uses additional memory by storing a pointer along with each hashed key segment (except the last segment) for keys that are larger than the minimum key size. In an embodiment, the pointers are used to connect each of the hashed key segments that correspond to a single key. Further, in some embodiments, key search/insertion unit 22 stores other information along with at least some hashed key segments, such as an indicator of the key size, and/or an indicator of a fragment number within a series of hashed key segments that correspond to a single key. As will be described in more detail below, the pointers (and indicators of key size and/or fragment number, if present) allow stored keys to be reconstructed when performing a search.

In the example embodiment and scenario of FIG. 3, key search/insertion unit 22 successfully inserts a hashed key segment "A" corresponding to a minimum size key into address 80-1 of the hash table portion stored in memory bank 30-2, successfully inserts hashed key segments "B1" and "B2" corresponding to a key twice the minimum size into addresses 82-1 and 82-2 of the hash table portions stored in memory banks 30-1 and 30-3, respectively, successfully inserts hashed key segments "C1" and "C2" corresponding to a key twice the minimum size into addresses 84-1 and 84-2 of the hash table portions stored in memory banks 30-2 and 30-4, respectively, successfully inserts hashed key segments "D1," "D2" and "D3" corresponding to a key three times the minimum size into addresses 86-1, 86-2 and 86-3 of the hash table portions stored in memory banks 30-1, 30-3 and 30-4, respectively, and successfully inserts hashed key segments "E1," "E2," "E3" and "E4" corresponding to a key four times the minimum size into addresses 88-1, 88-2, 88-3 and 88-4 of the hash table portions stored in memory banks 30-1, 30-2, 30-3 and 30-4, respectively. The various arrows between hashed key segments in FIG. 3 represent the pointers stored with the hashed key segment at the source of the arrow, in an embodiment. In the embodiment and scenario of FIG. 3, for example, address 82-1 of memory bank 30-1 stores the pointer from "B1" to "B2," address 84-1 of memory bank 30-2 stores the pointer from "C1" to "C2," and so forth.

In some embodiments, key search/insertion unit 22 inserts keys based on which of the hash table portions are most populated, and/or inserts keys using a cuckoo algorithm. In some embodiments, any suitable key insertion technique(s) or algorithm(s) described in U.S. patent application Ser. No. 13/737,608, and/or U.S. patent application Ser. No. 14/012,834, is/are implemented in conjunction with the techniques described herein. In some embodiments in which a cuckoo algorithm is implemented, key search/insertion unit 22 can evacuate an existing entry to store a new key/entry regardless of the size the old key.

In some embodiments of the second exact match lookup technique, key search/insertion unit 22 performs searches/lookups by accessing the hash table portions stored in memory banks 30-1 through 30-4 using the respective hash functions 32-1 through 32-4. In some embodiments, key search/insertion unit 22 identifies the segments of multi-hash lookup table 26 that are located at the resulting addresses/hash values, and retrieves any pointers associated with those matching segments. In some embodiments, key search/insertion unit 22 also retrieves other information, such as indicators of key size and/or segment number, for each of one or more of the matching segments. Key search/insertion unit 22 then uses the matching segments, pointers and (if present) key size and/or segment number information to identify which segments in multi-hash lookup table 26 correspond to which keys/entries, in an embodiment. If K matching segments are identified for a searched key having a size of K times the minimum key size, and if those K matching segments are connected via the appropriate pointers (and/or include the appropriate key size and/or segment number indicators to indicate that each matching segment is a part of a single key entry), then the entry corresponding to the K matching segments is identified as a matching entry, and key search/insertion unit 22 retrieves the value corresponding to that entry, in an embodiment.

With reference to the example scenario of FIG. 3, in one embodiment, key search/insertion unit 22 identifies a matching entry for a key having a size that is three times the minimum key size if hash function 32-1 results in a hashed key segment at address 86-1, hash function 32-3 results in a hashed key segment at address 86-2, and hash function 32-4 results in a hashed key segment at address 86-3 (i.e., the addresses associated with segments D1, D2 and D3, respectively). In an embodiment, however, key search/insertion unit 22 only identifies the entry corresponding to D1, D2 and D3 as a "matching" entry after retrieving the pointer from D1 to D2 and the pointer from D2 to D3, and/or retrieving information indicating that D1 is the first of three segments, D2 is the second of three segments, and D3 is the third of three segments. In one such embodiment/scenario, the result of hashing with hash function 32-2 is irrelevant, as key search/insertion unit 22 is able to distinguish (based on pointers, the known size of the searched key, and/or key size and/or segment number information associated with a matching segment) that any matching segment does not correspond to a part of a matching entry.

In another embodiment and scenario in which key search/insertion unit 22 performs a lookup for a key having a size three times the minimum key size, hash function 32-1 results in a hashed key segment at address 82-1, hash function 32-2 results in a hashed key segment at address 80-1, hash function 32-3 results in a hashed key segment at address 86-3, and hash function 32-4 does not result in a matching segment. In this embodiment/scenario, although three matching segments are identified, key search/insertion unit 22 does not identify a matching entry. In an embodiment, key search/insertion unit 22 rules out the matching segments at addresses 82-1, 80-1 and 86-3 because they are not connected by pointers, and/or because they do not include other information matching the searched key (e.g., because key search/insertion unit 22 determines that each of matching segments A, B1 and B2 are associated with key size indicators that do not match the key size indicator of the searched key, in an embodiment).

In some embodiments, either the first exact match lookup technique (corresponding to the example embodiment of FIG. 2) or the second exact match lookup technique (corresponding to the example embodiment of FIG. 3) is used in conjunction with other lookup techniques. In some embodiments, for example, lookup memory 24 is an SRAM that performs exact match lookups according to any embodiment of the first or second exact match lookup technique described above, and another memory (e.g., a ternary content-addressable memory (TCAM)) is used to perform masked searches and/or other exact match searches. In an embodiment, TCAM lookups are used in parallel with SRAM exact match lookups according to any suitable technique described in U.S. patent application Ser. No. 13/966,962.

Figure 4:
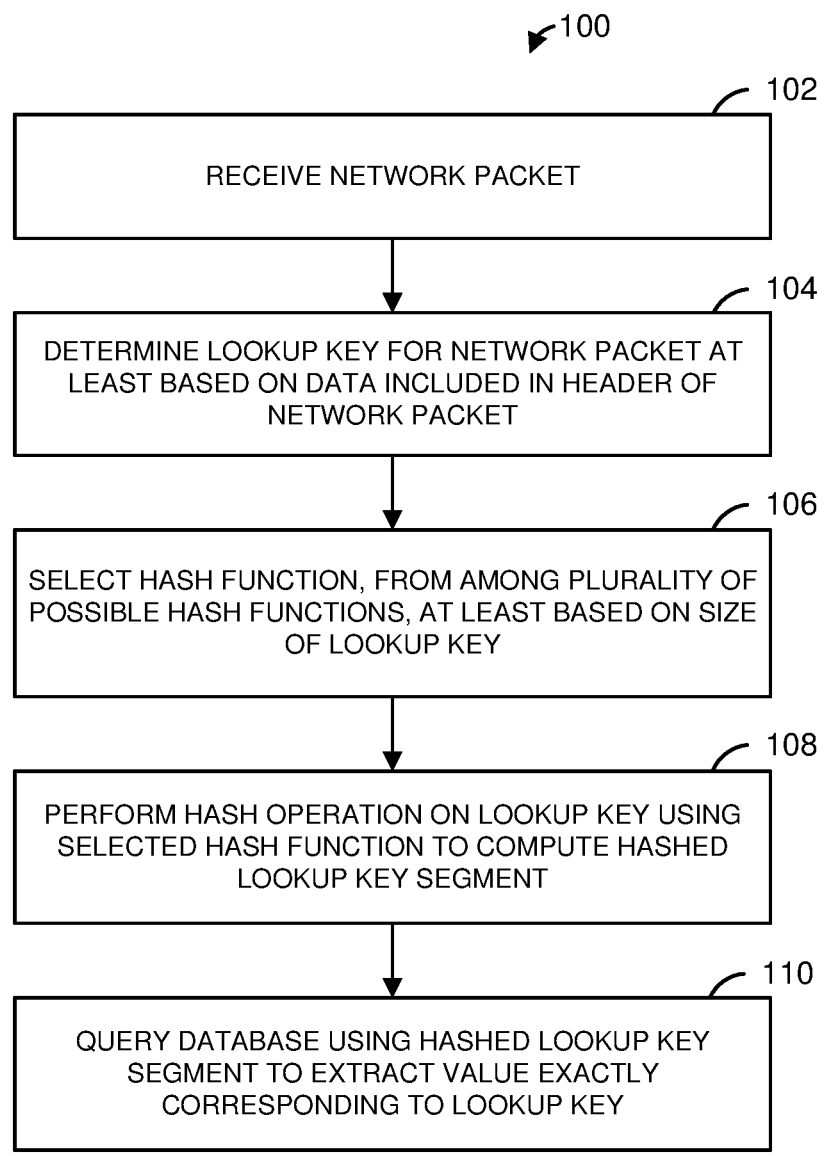
FIG. 4 is a flow diagram of an example method for performing an exact match lookup using a first technique, according to an embodiment.

FIG. 4 is a flow diagram of an example method 100 for performing an exact match lookup using a first technique, according to an embodiment. The method 100 is implemented in a network device, such as network device 10 of FIG. 1, for example.

At block 102, a network packet is received at the network device implementing the method 100. In an embodiment, the network packet is received by a packet processor (e.g., packet processor 14 of FIG. 1) via an interface of the network device (e.g., one of ports 12 of FIG. 1).

At block 104, a lookup key for the network packet received at block 102 is determined, at least based on data included in a header of the network packet and/or other information, such as an interface at which the network packet was received, for example. In an embodiment, block 104 is implemented by a key generation unit, such as key generation unit 20 of FIG. 1, for example. In some embodiments, for example, the lookup key is determined based on a MAC address, a VLAN or double VLAN tag, an IPv4 or IPv6 address, tunnel information, and/or any other suitable information within the header.

At block 106, a hash function is selected, from among a plurality of possible hash functions, at least based on the size of the lookup key. In an embodiment, block 106 is implemented by a key search unit, such as key search/insertion unit 22 of FIG. 1, for example. In some embodiments, the hash function is selected by virtue of identifying/selecting a hash table (e.g., by using the lookup key size to determine an index of a hash table to be accessed, in an embodiment), and selecting the hash function that corresponds to a first memory bank that stores at least a portion of the hash table. In other embodiments, the hash function is selected, based on key size, in another suitable manner, such as selecting the hash function that corresponds to a last memory bank that stores at least a portion of the hash table, for example. In some embodiments, the lookup key size is not an exact size of the key, but nonetheless serves as an indicator of the number of hashed key segments that correspond to a single database entry for the lookup key. In one embodiment, the key size is determined at block 106 based on the lookup key. In another embodiment, an indicator of the key size is generated at block 104 and appended to, included in, or otherwise associated with, the lookup key.

At block 108, a hash operation is performed on the lookup key using the hash function selected at block 106 to compute a hashed lookup key segment. In an embodiment, block 108 is implemented by a key search unit, such as key search/insertion unit 22 of FIG. 1, for example.

At block 110, a database is queried, using the hashed lookup key segment computed at block 108, to extract a value that exactly corresponds to the lookup key. In an embodiment, block 110 is implemented by a key search unit, such as key search/insertion unit 22 of FIG. 1, for example. In one embodiment, the database queried at block 110 is distributed among two or more memory banks (e.g., two or more memory banks of an SRAM or other suitable memory, such as lookup memory 24 of FIG. 1). In one embodiment where the hash function is selected (at block 106) from among N possible hash functions (with N being an integer greater than one), for example, the database queried at block 110 is distributed among N memory banks each corresponding to a different one of the N possible hash functions. In some embodiments, the database is queried by using the hashed lookup key segment to access each of at least two different banks of the two or more memory banks. In some embodiments, the hashed lookup key segment computed at block 108 has a size (bit length) equal to a width of each of the two or more memory banks.

In some embodiments, querying the database at block 110 includes accessing, in parallel and using the hashed lookup key segment, each of two or more different banks of the two or more memory banks to identify two or more respective matching segments, retrieving at least one key size indicator associated with at least one of the two or more matching segments, and identifying a matching entry in the database at least based on the two or more matching segments and the key size indicator(s). In one such embodiment, the value exactly corresponding to the lookup key is a value associated with the identified matching entry.

In some embodiments, the method 100 includes one or more additional blocks not seen in FIG. 4. In one embodiment, for example, the method 100 includes additional blocks similar to blocks 106 and 108, but for selecting a different hash function corresponding to a different hash table of the database, and for computing a different hashed lookup key segment. In one embodiment and/or scenario, the database is queried using the different hashed lookup key segment in a block similar to block 110, but no matching entry is identified, and therefore no value exactly corresponding to the lookup key is extracted.

Figure 5:
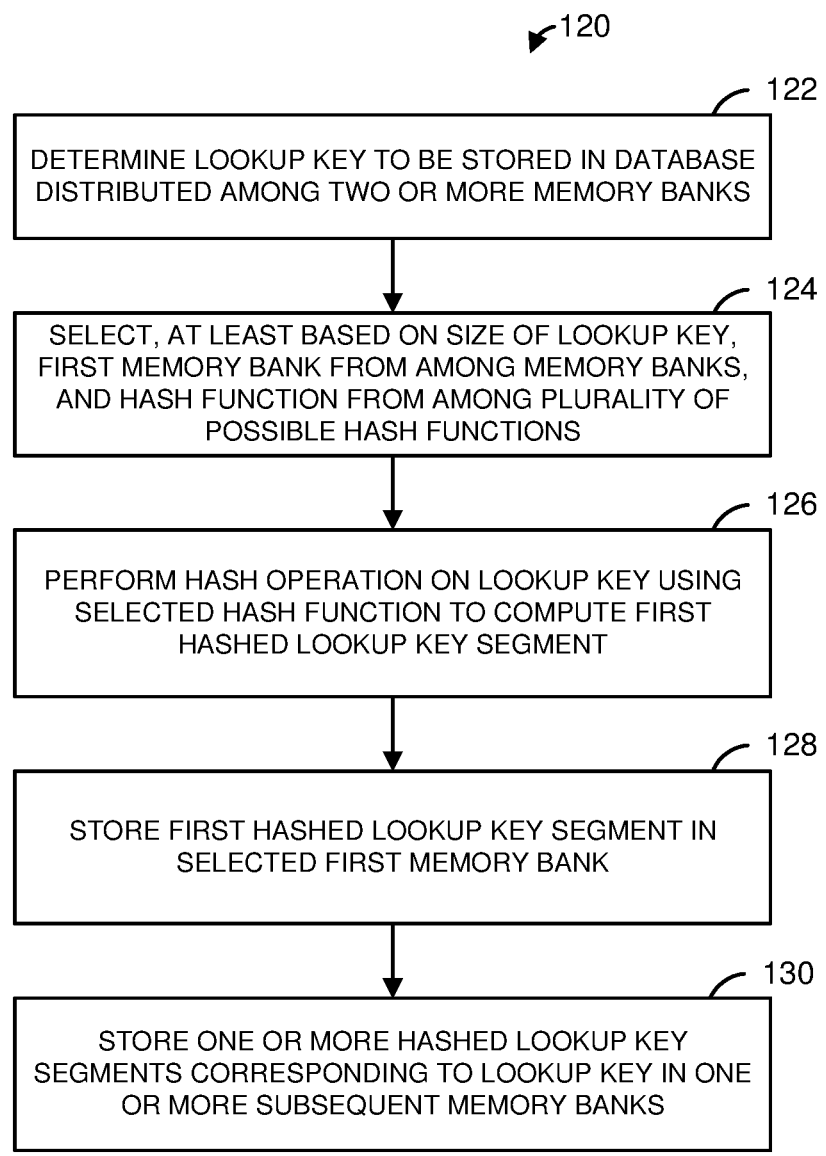
FIG. 5 is a flow diagram of an example method for populating an exact match lookup table using the first technique, according to an embodiment.

FIG. 5 is a flow diagram of an example method 120 for populating an exact match lookup table using the first technique, according to an embodiment. The method 120 is implemented in a network device, such as network device 10 of FIG. 1, for example.

At block 122, a lookup key, which is to be stored in a database distributed among two or more memory banks (e.g., two or more memory banks of an SRAM or other suitable memory), is determined. In an embodiment, block 122 is implemented by a key generation unit, such as key generation unit 20 of FIG. 1, for example. In some embodiments, for example, the lookup key is determined based on a MAC address, a VLAN or double VLAN tag, an IPv4 or IPv6 address, tunnel information, and/or any other suitable information within a packet header, and/or based on other information, such as an interface at which a packet was received, for example.

At block 124, a first memory bank is selected from among the two or more memory banks, and a hash function is selected from among a plurality of possible hash functions, at least based on the size of the lookup key determined at block 122. In an embodiment, block 124 is implemented by a key insertion unit, such as key search/insertion unit 22 of FIG. 1, for example. In one embodiment where the hash function is selected from among N possible hash functions (with N being an integer greater than one), for example, the database is distributed among N memory banks each corresponding to a different one of the N possible hash functions. In an embodiment, the first memory bank is the first of K memory banks used to store hashed lookup key segments corresponding to the lookup key, and the selected hash function is selected by identifying/selecting the first memory bank (or by identifying/selecting a hash table that begins at the first memory bank, etc.). In one embodiment, the key size is determined at block 124 based on the lookup key. In another embodiment, an indicator of the key size is generated at block 122 and is appended to, included in, or otherwise associated with the lookup key.

At block 126, a hash operation is performed on the lookup key, using the hash function selected at block 124, to compute a first hashed lookup key segment. In an embodiment, block 126 is implemented by a key insertion unit, such as key search/insertion unit 22 of FIG. 1, for example. In some embodiments, the first hashed lookup key segment computed at block 126 has a size (bit length) equal to a width of each of the two or more memory banks.

At block 128, the first hashed lookup key segment computed at block 126 is stored in (written to) the first memory bank selected at block 124. In an embodiment, block 128 is implemented by a key insertion unit, such as key search/insertion unit 22 of FIG. 1, for example.

At block 130, one or more other hashed lookup key segments corresponding to the lookup key are stored in one or more subsequent memory banks of the two or more memory banks. In an embodiment, block 130 is implemented by a key insertion unit, such as key search/insertion unit 22 of FIG. 1, for example. In an embodiment, the one or more subsequent memory banks are adjacent to the first memory bank selected at block 124. In one embodiment where a same hash function is used to access each of multiple memory banks when inserting a key larger than the minimum key size, each of the one or more other hashed lookup key segments stored in the subsequent (e.g., adjacent) memory banks is exactly equal to the first hashed lookup key segment. In other embodiments, one or more of the other hashed lookup key segments are calculated using different hash functions, and are therefore different than the first hashed lookup key.

In some embodiments, the method 120 includes one or more additional blocks not seen in FIG. 5. In one embodiment, for example, the method 120 includes additional blocks similar to blocks 124 and 126, but corresponding to the one or more other hashed lookup key segments stored at block 130. As another example, in an embodiment, the method 120 further includes a block in which it is determined whether one or more existing entries in the database can be moved to a new location in the database. In one such embodiment and scenario, the existing entr(ies) are either a single entry corresponding to another lookup key that is larger than the lookup key determined at block 122, or two or more entries corresponding to two or more other lookup keys that are smaller than the lookup key determined at block 122. Moreover, in an embodiment, storing the first hashed lookup key segment at block 128 (and/or storing the one or more other hashed lookup key segments at block 130) is performed in response to determining that each of the one or more existing entries can be moved to a new location in the database.

Figure 6:
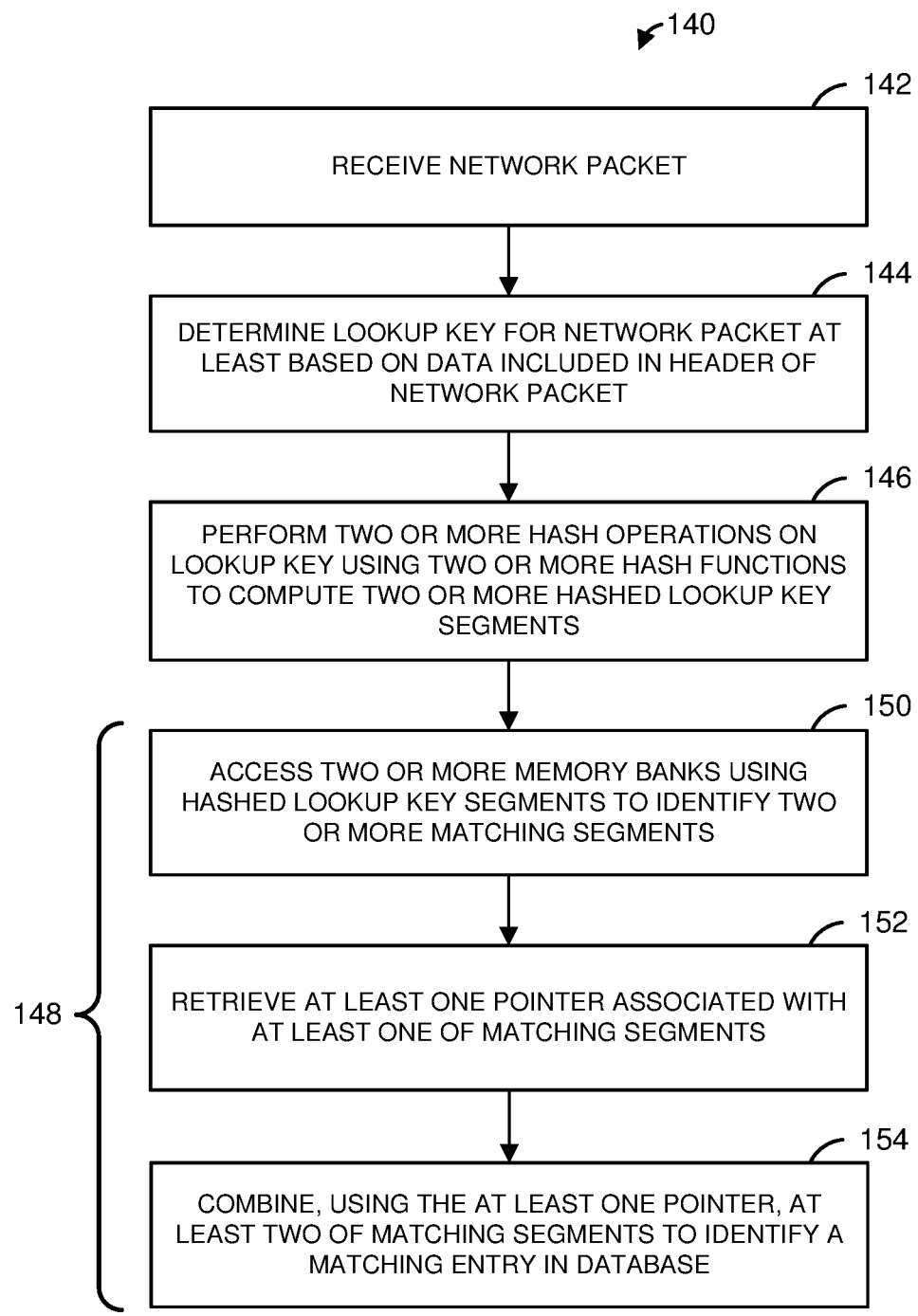
FIG. 6 is a flow diagram of an example method for performing an exact match lookup using a second technique, according to an embodiment.

FIG. 6 is a flow diagram of an example method 140 for performing an exact match lookup using a second technique, according to an embodiment. The method 140 is implemented in a network device, such as network device 10 of FIG. 1, for example.

At block 142, a network packet is received at the network device implementing the method 140. In an embodiment, the network packet is received by a packet processor (e.g., packet processor 14 of FIG. 1) via an interface of the network device (e.g., one of ports 12 of FIG. 1).

At block 144, a lookup key for the network packet received at block 142 is determined, at least based on data included in a header of the network packet, and/or based on other information, such as an interface at which the network packet was received, for example. In an embodiment, block 144 is implemented by a key generation unit, such as key generation unit 20 of FIG. 1, for example. In some embodiments, for example, the lookup key is determined based on a MAC address, a VLAN or double VLAN tag, an IPv4 or IPv6 address, tunnel information, and/or any other suitable information within the header.

At block 146, two or more hash operations are performed on the lookup key (determined at block 144) using two or more respective hash functions, to compute two or more respective hashed lookup key segments. In an embodiment, block 146 is implemented by a key search unit, such as key search/insertion unit 22 of FIG. 1, for example.

At blocks 148 (comprising blocks 150, 152 and 154), a database is queried, using the two or more hashed lookup key segments computed at block 146, to extract a value that exactly corresponds to the lookup key. In an embodiment, blocks 148 are implemented by a key search unit, such as key search/insertion unit 22 of FIG. 1, for example. The database queried at blocks 148 is distributed among two or more memory banks (e.g., two or more memory banks of an SRAM or other suitable memory). In one embodiment, for example, the database queried at blocks 148 is distributed among N memory banks each corresponding to a different one of N hash functions, and the hash operations at block 146 include N hash operations using the N different hash functions. Moreover, in some embodiments, each of the hashed lookup key segments computed at block 146 has a size (bit length) equal to a width of each of the two or more memory banks.

At block 150, the two or more memory banks are accessed using the hashed lookup key segments computed at block 146 to identify two or more respective matching segments. In some embodiments, all of the two or more memory banks are accessed in parallel. In other embodiments, the memory banks are accessed at least in part sequentially.

At block 152, at least one pointer associated with at least one of the matching segments identified at block 150 is retrieved. In an embodiment, the retrieved pointer(s) include at least a first pointer associated with a first one of the matching segments, where the first pointer indicates a location, in the memory banks, of a second matching segment of the matching segments.

At block 154, at least two of the matching segments identified at block 150 are combined, using the pointer(s) retrieved at block 152, to identify a matching entry in the database. In an embodiment, whether a reconstructed/combined key is determined to be a matching entry depends at least in part on the size of the lookup key. In one embodiment, the size of the lookup key is determined at block 154 based on the lookup key itself. In another embodiment, an indicator of the key size is generated at block 144 and appended to, included in, or otherwise associated with the lookup key. In an embodiment, the value (extracted at blocks 148) that exactly corresponds to the lookup key is a value associated with the identified matching entry.

In some embodiments, the method 140 includes one or more additional blocks not seen in FIG. 6. In one embodiment, for example, blocks 148 further include a block in which a key size indicator associated with at least one of the matching segments is retrieved. In one such embodiment, block 154 includes combining the matching segments using the retrieved pointer(s) and the retrieved key size indicator.

It is noted that the method 140 corresponds to an embodiment and scenario in which a lookup key having at least twice the minimum key length is searched. In some embodiments and scenarios corresponding to minimum length lookup keys, at least blocks 152 and 154 are omitted.

Figure 7:
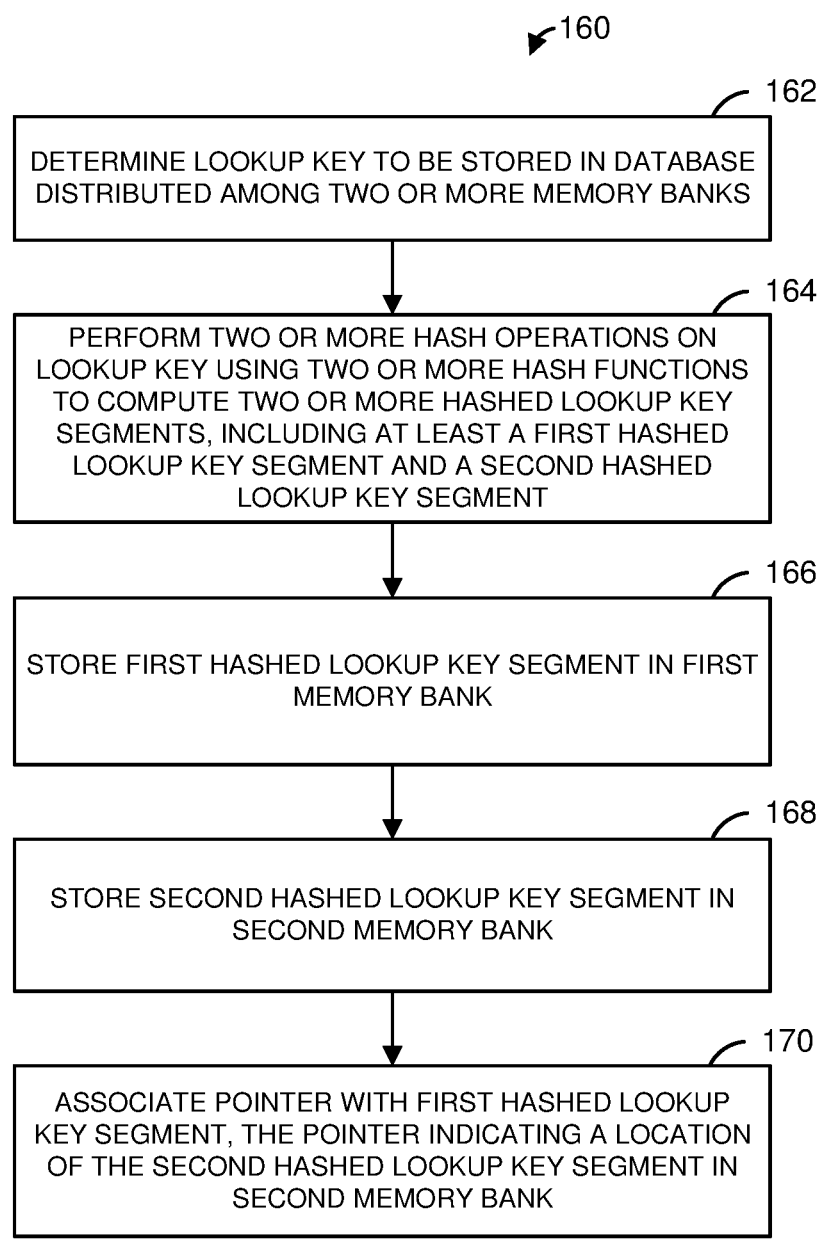
FIG. 7 is a flow diagram of an example method for populating an exact match lookup table using the second technique, according to an embodiment.

FIG. 7 is a flow diagram of an example method 160 for populating an exact match lookup table using the second technique, according to an embodiment. The method 160 is implemented in a network device, such as network device 10 of FIG. 1, for example.

At block 162, a lookup key, which is to be stored in a database distributed among two or more memory banks (e.g., two or more memory banks of an SRAM or other suitable memory), is determined. In an embodiment, block 162 is implemented by a key generation unit, such as key generation unit 20 of FIG. 1, for example. In some embodiments, for example, the lookup key is determined based on a MAC address, a VLAN or double VLAN tag, an IPv4 or IPv6 address, tunnel information, and/or any other suitable information within a packet header, and/or based on other information, such as an interface at which a packet was received.

At block 164, two or more hash operations are performed on the lookup key using two or more respective hash functions, to compute two or more respective hashed lookup key segments. In an embodiment, block 164 is implemented by a key insertion unit, such as key search/insertion unit 22 of FIG. 1, for example. The hashed lookup key segments include at least a first hashed lookup key segment and a second hashed lookup key segment. In some embodiments, the hashed lookup key segments computed at block 164 each have a size (bit length) equal to a width of each of the two or more memory banks.

At block 166, the first hashed lookup key segment is stored in (written to) a first memory bank of the two or more memory banks. At block 168, the second hashed lookup key segment is stored in (written to) a second, different memory bank of the two or more memory banks. In an embodiment, blocks 166 and 168 are implemented by a key insertion unit, such as key search/insertion unit 22 of FIG. 1, for example. In some embodiments, blocks 166 and 168 are performed in parallel. In some embodiments and/or scenarios, the second memory bank in which the second hashed lookup key segment is stored is not adjacent to the first memory bank storing the first hashed lookup key segment. In other embodiments and/or scenarios, the second memory bank is adjacent to the first memory bank storing the first hashed lookup key segment.

At block 170, a pointer is associated with the first hashed lookup key segment. In an embodiment, the pointer indicates a location of the second hashed lookup key segment in the second memory bank (e.g., indicates the address of the second hashed lookup key segment, in an embodiment). In an embodiment, block 170 is implemented by a key insertion unit, such as key search/insertion unit 22 of FIG. 1, for example. In an embodiment, the pointer is associated with the first hashed lookup key segment by being written to a same memory location/address (within the first memory bank) as the first hashed lookup key segment.

In some embodiments, the method 160 includes one or more additional blocks not seen in FIG. 7. In one embodiment and/or scenario, for example, the method 160 includes an additional block similar to block 166 or 168, but in which a third hashed lookup key segment is stored in a third memory bank (or third and fourth hashed lookup key segments are stored in third and fourth memory banks, etc.). As another example embodiment, the method 160 further includes a block in which a key size indicator is associated with at least the first hashed lookup key segment and/or the second hashed lookup key segment, and/or a block in which a segment number indicator is associated with at least the first hashed lookup key segment and/or the second hashed lookup key segment.

It is noted that the method 160 corresponds to an embodiment and scenario in which a lookup key having at least twice the minimum key length is inserted into a database. In some embodiments and scenarios corresponding to minimum length lookup keys, at least block 170 is omitted.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for populating an exact match lookup table in a network device, the method comprising:
generating a first lookup value to be stored in a database of the network device, the database being distributed among a plurality of memory banks that includes at least a first memory bank and a second memory bank, wherein a plurality of hash functions are respectively associated with the plurality of memory banks, the plurality of hash functions including i) a first hash function that is used at least for determining locations for storing lookup values entirely in the first memory bank, and ii) a second hash function that is used at least for determining locations for storing lookup values entirely in the second memory bank;

determining, based on a size of the first lookup value, whether the first lookup value is to be stored i) entirely within the second memory bank, or ii) across a set of two or more memory banks among the plurality of memory banks, the set of memory banks including at least the first memory bank and the second memory bank;

in response to determining, based on the size of the first lookup value, that the first lookup value is to be stored across the set of memory banks including at least the first memory bank and the second memory bank,
  selecting the first hash function from among the plurality of hash functions,
  performing a hash operation on the first lookup value using the first hash function associated with the first memory bank to determine respective first memory locations for storing the first lookup value, the respective first memory locations corresponding to respective memory banks in the set of memory banks,
  storing a first segment of the first lookup value in the first memory bank at one of the first memory locations determined using the first hash function associated with the first memory bank, and
  storing a second segment of the first lookup value in the second memory bank at another one of the first memory locations determined using the first hash function associated with the first memory bank;

generating a second lookup value to be stored in the database of the network device;

determining, based on a size of the second lookup value, that the second lookup value is to be stored entirely within the second memory bank;

selecting the second hash function from among the plurality of hash functions;

performing a hash operation on the second lookup value using the second hash function associated with the second memory bank to determine a second memory location for storing the second lookup value; and storing the second lookup value entirely in the second memory bank at the second memory location determined using the second hash function associated with the second memory bank.

2. The method of claim 1, wherein:
the set of multiple memory banks is a first set of memory banks;
the plurality of memory banks further includes a third memory bank;
the plurality of hash functions further includes a third hash function for determining locations for storing lookup values entirely in the third memory bank;
the method further comprises:
  generating a third lookup value to be stored in the database of the network device,
  determining, based on a size of the third lookup value, that the third lookup value is to be stored across a second set of at least two memory banks among the plurality of memory banks, the second set of memory banks including at least the first memory bank and the third memory bank,
  selecting the third hash function from among the plurality of hash functions, the third hash function for determining locations in the third memory bank,
  performing a hash operation on the third lookup value using the third hash function associated with the third memory bank to determine respective third memory locations for storing the third lookup value, the respective third memory locations corresponding to respective memory banks in the second set of memory banks,
  storing a first segment of the third lookup value in the first memory bank at one of the third memory locations determined using the third hash function associated with the third memory bank, and
  storing a second segment of the third lookup value in the third memory bank at another one of the third memory locations determined using the third hash function associated with the third memory bank.

3. The method of claim 1, wherein:
the set of multiple memory banks is a first set of memory banks;
the plurality of memory banks further includes a third memory bank;
the plurality of hash functions further includes a third hash function for determining locations for storing lookup values entirely in the third memory bank;
the method further comprises:
  generating a third lookup value to be stored in the database of the network device,
  determining, based on a size of the third lookup value, that the third value is to be stored across a second set of at least two memory banks among the plurality of memory banks, the second set of memory banks including at least the first memory bank and the third memory bank,
  selecting the first hash function from among the plurality of hash functions,
  performing a hash operation on the third lookup value using the first hash function associated with the first memory bank to determine respective third memory locations for storing the third lookup value, the respective third memory locations corresponding to respective memory banks in the second set of memory banks,
  storing a first segment of the third lookup value in the first memory bank at one of the third memory locations determined using the first hash function associated with the first memory bank, and
  storing a second segment of the third lookup value in the third memory bank at another one of the third memory locations determined using the first hash function associated with the first memory bank.

4. The method of claim 1, wherein:
the set of multiple memory banks is a first set of memory banks;
the plurality of memory banks further includes a third memory bank;
the plurality of hash functions further includes a third hash function for determining locations for storing lookup values entirely in the third memory bank;
the method further comprises:
  generating a third lookup value to be stored in the database of the network device,
  determining, based on a size of the third lookup value, that the third lookup value is to be stored across a second set of at least two memory banks among the plurality of memory banks, the second set of memory banks including at least the second memory bank and the third memory bank,
  selecting the second hash function from among the plurality of hash functions,
  performing a hash operation on the third lookup value using the second hash function associated with the second memory bank to determine respective third memory locations for storing the third lookup value, the respective third memory locations corresponding to respective memory banks in the second set of memory banks, storing a first segment of the third lookup value in the second memory bank at one of the third memory locations determined using the second hash function associated with the second memory bank, and storing a second segment of the third lookup value in the third memory bank at another one of the third memory locations determined using the second hash function associated with the second memory bank.

5. The method of claim 1, wherein:

the set of multiple memory banks is a first set of memory banks;

the plurality of memory banks further includes a third memory bank;

the plurality of hash functions further includes a third hash function for determining locations for storing lookup values entirely in the third memory bank;

the method further comprises:

generating a third lookup value to be stored in the database of the network device, determining, based on a size of the third lookup value, that the third lookup value is to be stored across a second set of at least two memory banks among the plurality of memory banks, the second set of memory banks including the first memory bank, the second memory bank, and the third memory bank, selecting the first hash function from among the plurality of hash functions, performing a hash operation on the third lookup value using the first hash function associated with the first memory bank to determine respective third memory locations for storing the third lookup value, the respective third memory locations corresponding to respective memory banks in the second set of memory banks, storing a first segment of the third lookup value in the first memory bank at one of the third memory location determined using the first hash function associated with the first memory bank, storing a second segment of the third lookup value in the second memory bank at another one of the third memory locations determined using the first hash function associated with the first memory bank, and storing a third segment of the third lookup value in the third memory bank at a further one of the third memory locations determined using the first hash function associated with the first memory bank.

6. The method of claim 1, wherein:

the set of multiple memory banks is a first set of memory banks;

the plurality of memory banks further includes a third memory bank;

the plurality of hash functions further includes a third hash function for determining locations for storing lookup values entirely in the third memory bank;

the method further comprises:

generating a third lookup value to be stored in the database of the network device, determining, based on a size of the third lookup value, that the third lookup value is to be stored across a second set of at least two memory banks among the plurality of memory banks, the second set of memory banks including the first memory bank, the second memory bank, and the third memory bank, selecting the third hash function from among the plurality of hash functions, performing a hash operation on the third lookup value using the third hash function associated with the third memory bank to determine respective third memory locations for storing the third lookup value, the respective third memory locations corresponding to respective memory banks in the second set of memory banks, storing a first segment of the third lookup value in the first memory bank at one of the third memory locations determined using the third hash function associated with the third memory bank, storing a second segment of the third lookup value in the second memory bank at another one of the third memory locations determined using the third hash function associated with the third memory bank, and storing a third segment of the third lookup value in the third memory bank at a further one of the third memory locations determined using the third hash function associated with the third memory bank.

7. The method of claim 1, wherein:

the set of multiple memory banks is a first set of memory banks;

the plurality of memory banks further includes a third memory bank and a fourth memory bank;

the plurality of hash functions further includes: a third hash function for determining locations for storing lookup values entirely in the third memory bank, and a fourth hash function for determining locations for storing lookup values entirely in the fourth memory bank;

the method further comprises:

generating a third lookup value to be stored in the database of the network device, and determining, based on a size of the third lookup value, whether the third lookup value is to be stored:

entirely within the first memory bank, entirely within the second memory bank, entirely within the third memory bank, entirely within the fourth memory bank, across the first set of memory banks, across a second set of at least two memory banks among the plurality of memory banks, the second set of memory banks including at least the third memory bank and the fourth memory bank, across a third set of at least three memory banks among the plurality of memory banks, the third set of memory banks including at least the first memory bank, the second memory bank, and the third memory bank, or across a fourth set of at least three memory banks among the plurality of memory banks, the fourth set of memory banks including at least the first memory bank, the second memory bank, the third memory bank, and the fourth memory bank;

wherein the method further comprises:

selecting the first hash function when the third lookup value is to be stored entirely within the first memory bank, across the first set of memory banks, across the third set of memory banks, or across the fourth set of memory banks, selecting the second hash function when the third lookup value is to be stored entirely within the second memory bank, selecting the third hash function when the third lookup value is to be stored entirely within the third memory bank, or across second set of memory banks, selecting the fourth hash function when the third lookup value is to be stored entirely within the fourth memory bank, and performing a hash operation on the third lookup value using the selected hash function to determine one or more respective third memory locations for storing the third lookup value within one or more of the memory banks within the plurality of memory banks.

8. The method of claim 1, wherein:
the plurality of memory banks consists of N memory banks, wherein N is an integer greater than one; and
the plurality of hash functions consists of N hash functions, each hash function for storing lookup values entirely in a respective memory bank.

9. A network device, comprising:
a plurality of interfaces associated with network communication links;
a lookup memory storing a database distributed among a plurality of memory banks that includes at least a first memory bank and a second memory bank, wherein a plurality of hash functions are respectively associated with the plurality of memory banks, the plurality of hash functions including i) a first hash function that is used at least for determining locations for storing lookup values entirely in the first memory bank, and ii) a second hash function that is used at least for determining locations for storing lookup values entirely in the second memory bank; and
a packet processor coupled to the plurality of interfaces, the packet processor being configured to process network packets received via at least some of the plurality of interfaces,
wherein the packet processor comprises
a lookup value generation unit configured to generate a first lookup value to be stored in the database, and
a lookup value insertion unit configured to:
determine, based on a size of the first lookup value, whether the first lookup value is to be stored i) entirely within the second memory bank, or ii) across a set of multiple memory banks among the plurality of memory banks, the set of memory banks including the first memory bank and the second memory bank,
in response to determining, based on the size of the first lookup value, that the first lookup value is to be stored across the set of memory banks including at least the first memory bank and the second memory bank,
select the first hash function from among the plurality of hash functions,
perform a hash operation on the first lookup value using the first hash function associated with the first memory bank to determine respective first memory locations for storing the first lookup value, the respective first memory locations corresponding to respective memory banks in the set of memory banks,
store a first segment of the first lookup value in the first memory bank at one of the first memory locations determined using the first hash function associated with the first memory bank, and
store a second segment of the first lookup value in the second memory bank at another one of the first memory locations determined using the first hash function associated with the first memory bank;

wherein the lookup value insertion unit is further configured to:
generate a second lookup value to be stored in the database,
determine, based on a size of the second lookup value, that the second lookup value is to be stored entirely within the second memory bank,
select the second hash function from among the plurality of hash functions,
perform a hash operation on the second lookup value using the second hash function associated with the second memory bank to determine a second memory location for storing the lookup value, and
store the second lookup value entirely in the second memory bank at the second memory location determined using the second hash function associated with the second memory bank.

10. The network device of claim 9, wherein:
the set of multiple memory banks is a first set of memory banks;
the plurality of memory banks further includes a third memory bank;
the plurality of hash functions further includes a third hash function for determining locations in the third memory bank; and
the lookup value insertion unit is further configured to:
generate a third lookup value to be stored in the database,
determine, based on a size of the third lookup value, that the third lookup value is to be stored across a second set of multiple memory banks among the plurality of memory banks, the second set of memory banks including at least the first memory bank and the third memory bank,
select the third hash function from among the plurality of hash functions, the third hash function for determining locations for storing lookup values entirely in the third memory bank,
perform a hash operation on the third lookup value using the third hash function associated with the third memory bank to determine respective third memory locations for storing the third lookup value, the respective third memory locations corresponding to respective memory banks in the second set of memory banks,
store a first segment of the third lookup value in the first memory bank at one of the third memory locations determined using the third hash function associated with the third memory bank, and
store a second segment of the third lookup value in the third memory bank at another one of the third memory locations determined using the third hash function associated with the third memory bank.

11. The network device of claim 9, wherein:
the set of multiple memory banks is a first set of memory banks;
the plurality of memory banks further includes a third memory bank;
the plurality of hash functions further includes a third hash function for determining locations for storing lookup values entirely in the third memory bank;
the lookup value insertion unit is further configured to:
generate a third lookup value to be stored in the database of the network device,
determine, based on a size of the third lookup value, that the third lookup value is to be stored across a second set of at least two memory banks among the plurality of memory banks, the second set of memory banks including at least the first memory bank and the third memory bank, select the first hash function from among the plurality of hash functions, perform a hash operation on the third lookup value using the first hash function associated with the first memory bank to determine respective third memory locations for storing the third lookup value, the respective third memory locations corresponding to respective memory banks in the second set of memory banks, store a first segment of the third lookup value in the first memory bank at one of the third memory locations determined using the first hash function associated with the first memory bank, and store a second segment of the third lookup value in the third memory bank at another one of the third memory locations determined using the first hash function associated with the first memory bank.

12. The network device of claim 9, wherein:

the set of multiple memory banks is a first set of memory banks;

the plurality of memory banks further includes a third memory bank;

the plurality of hash functions further includes a third hash function for determining locations for storing lookup values entirely in the third memory bank;

the lookup value insertion unit is further configured to:
generate a third lookup value to be stored in the database of the network device, determine, based on a size of the third lookup value, that the third lookup value is to be stored across a second set of at least two memory banks among the plurality of memory banks, the second set of memory banks including at least the second memory bank and the third memory bank, select the second hash function from among the plurality of hash functions, perform a hash operation on the third lookup value using the second hash function associated with the second memory bank to determine respective third memory locations for storing the third lookup value, the respective third memory locations corresponding to respective memory banks in the second set of memory banks, store a first segment of the third lookup value in the second memory bank at one of the third memory locations determined using the second hash function associated with the second memory bank, and store a second segment of the third lookup value in the third memory bank at another one of the third memory locations determined using the second hash function associated with the second memory bank.

13. The network device of claim 9, wherein:

the set of multiple memory banks is a first set of memory banks;

the plurality of memory banks further includes a third memory bank;

the plurality of hash functions further includes a third hash function for determining locations for storing lookup values entirely in the third memory bank;

the lookup value insertion unit is further configured to:
generate a third lookup value to be stored in the database of the network device, determine, based on a size of the third lookup value, that the third lookup value is to be stored across a second set of at least two memory banks among the plurality of memory banks, the second set of memory banks including the first memory bank, the second memory bank, and the third memory bank, select the first hash function from among the plurality of hash functions, perform a hash operation on the third lookup value using the first hash function associated with the first memory bank to determine respective third memory locations for storing the third lookup value, the respective third memory locations corresponding to respective memory banks in the second set of memory banks, store a first segment of the third lookup value in the first memory bank at one of the third memory locations determined using the first hash function associated with the first memory bank, store a second segment of the third lookup value in the second memory bank at another one of the third memory locations determined using the first hash function associated with the first memory bank, and store a third segment of the third lookup value in the third memory bank at a further one of the third memory locations determined using the first hash function associated with the first memory bank.

14. The network device of claim 9, wherein:

the set of multiple memory banks is a first set of memory banks;

the plurality of memory banks further includes a third memory bank;

the plurality of hash functions further includes a third hash function for determining locations for storing lookup values entirely in the third memory bank;

the lookup value insertion unit is further configured to:
generate a third lookup value to be stored in the database of the network device, determine, based on a size of the third lookup value, that the third lookup value is to be stored across a second set of at least two memory banks among the plurality of memory banks, the second set of memory banks including the first memory bank, the second memory bank, and the third memory bank, select the third hash function from among the plurality of hash functions, perform a hash operation on the third lookup value using the third hash function associated with the third memory bank to determine respective third memory locations for storing the third lookup value, the respective third memory locations corresponding to respective memory banks in the second set of memory banks, store a first segment of the third lookup value in the first memory bank at one of the third memory locations determined using the third hash function associated with the third memory bank, store a second segment of the third lookup value in the second memory bank at another one of the third memory locations determined using the third hash function associated with the third memory bank, and store a third segment of the third lookup value in the third memory bank at a further one of the third memory locations determined using the third hash function associated with the third memory bank.

15. The network device of claim 9, wherein:

the set of multiple memory banks is a first set of memory banks;

the plurality of memory banks further includes a third memory bank and a fourth memory bank;

the plurality of hash functions further includes: a third hash function for determining locations for storing lookup values entirely in the third memory bank, and a fourth hash function for determining locations for storing lookup values entirely in the fourth memory bank;

the lookup value insertion unit is further configured to:
generate a third lookup value to be stored in the database of the network device, and determine, based on a size of the third lookup value, whether the third lookup value is to be stored:
entirely within the first memory bank,
entirely within the second memory bank,
entirely within the third memory bank,
entirely within the fourth memory bank,
across the first set of memory banks,
across a second set of at least two memory banks among the plurality of memory banks, the second set of memory banks including at least the third memory bank and the fourth memory bank,
across a third set of at least three memory banks among the plurality of memory banks, the third set of memory banks including at least the first memory bank, the second memory bank, and the third memory bank, or
across a fourth set of at least three memory banks among the plurality of memory banks, the fourth set of memory banks including at least the first memory bank, the second memory bank, the third memory bank, and the fourth memory bank;

wherein the lookup value insertion unit is further configured to:
select the first hash function when the third lookup value is to be stored entirely within the first memory bank, across the first set of memory banks, across the third set of memory banks, or across the fourth set of memory banks,
select the second hash function when the third lookup value is to be stored entirely within the second memory bank,
select the third hash function when the third lookup value is to be stored entirely within the third memory bank, or across second set of memory banks,
select the fourth hash function when the third lookup value is to be stored entirely within the fourth memory bank, and
perform a hash operation on the third lookup value using the selected hash function to determine one or more respective third memory locations for storing the third lookup value within one or more of the memory banks within the plurality of memory banks.

16. The network device of claim 9, wherein:
the plurality of memory banks consists of N memory banks, wherein N is an integer greater than one; and
the plurality of hash functions consists of N hash functions, each hash function for storing lookup values entirely in a respective memory bank.

17. The method of claim 1, further comprising:
in response to determining, based on the size of the first lookup value, that the first lookup value is to be stored entirely in the second memory bank:
selecting the second hash function from among the plurality of hash functions,
performing a second hash operation on the first lookup value using the second hash function associated with the second memory bank to determine a third memory location for storing the first lookup value entirely in the second memory bank, and
storing the first lookup value entirely in the second memory bank at the third memory location determined using the second hash function associated with the second memory bank.

18. The network device of claim 9, wherein the lookup value insertion unit is further configured to:
in response to determining, based on the size of the first lookup value, that the first lookup value is to be stored entirely in the second memory bank:
select the second hash function from among the plurality of hash functions,
perform a second hash operation on the first lookup value using the second hash function associated with the second memory bank to determine a third memory location for storing the first lookup value entirely in the second memory bank, and
store the first lookup value entirely in the second memory bank at the third memory location determined using the second hash function associated with the second memory bank.

* * * * *